(12) United States Patent
Koide

(10) Patent No.: US 8,373,124 B2
(45) Date of Patent: Feb. 12, 2013

(54) INFRARED DETECTION CIRCUIT, SENSOR DEVICE, AND ELECTRONIC INSTRUMENT

(75) Inventor: Yasunori Koide, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 12/974,789

(22) Filed: Dec. 21, 2010

(65) Prior Publication Data

US 2011/0155910 A1 Jun. 30, 2011

(30) Foreign Application Priority Data

Dec. 24, 2009 (JP) ................. 2009-291819

(51) Int. Cl.
*G01J 5/00* (2006.01)
(52) U.S. Cl. .................................. 250/338.1
(58) Field of Classification Search ............... 250/338.1
See application file for complete search history.

(56) References Cited

U.S. PATENT DOCUMENTS

| | | | |
|---|---|---|---|
| 4,902,895 A | 2/1990 | Hanson | |
| 5,442,176 A * | 8/1995 | Eckel et al. | 250/338.4 |
| 5,489,776 A * | 2/1996 | Lung | 250/332 |
| 6,249,002 B1 * | 6/2001 | Butler | 250/338.4 |
| 7,567,451 B2 | 7/2009 | Koide | |
| 7,570,506 B2 | 8/2009 | Koide | |
| 2002/0051376 A1 | 5/2002 | Yamamoto et al. | |
| 2005/0279939 A1 | 12/2005 | Yoshida et al. | |
| 2007/0125949 A1 | 6/2007 | Murata et al. | |
| 2009/0310397 A1 | 12/2009 | Koide | |

FOREIGN PATENT DOCUMENTS

| | | |
|---|---|---|
| JP | 59-142427 A | 8/1984 |
| JP | 2006-003301 A | 1/2006 |
| JP | 2008-026249 A | 2/2008 |
| JP | 2008-059722 A | 3/2008 |
| JP | 2008-059723 A | 3/2008 |
| JP | 2008-059724 A | 3/2008 |
| JP | 2008-140493 A | 6/2008 |
| JP | 2009-070488 A | 4/2009 |
| JP | 2009-301658 A | 12/2009 |

OTHER PUBLICATIONS

Extended European Search Report dated Apr. 28, 2011 for the counterpart European Application No. 10196151.4.

* cited by examiner

*Primary Examiner* — Marcus Taningco
(74) *Attorney, Agent, or Firm* — Global IP Counselors, LLP

(57) ABSTRACT

An infrared detection circuit includes a charge transferring transistor, a gate control circuit and a negative potential generating circuit. The charge transferring transistor is disposed between a read node configured to be connected to one end of an infrared detection element and a tank node to transfer an electric charge from the infrared detection element to the tank node. The gate control circuit is connected to a gate of the charge transferring transistor. The negative potential generating circuit is connected to the tank node to set the tank node to a negative electric potential when the charge transferring transistor transfers the electric charge.

18 Claims, 14 Drawing Sheets

SENSOR CELL

INFRARED DETECTION CIRCUIT, SENSOR DEVICE, AND ELECTRONIC INSTRUMENT

CROSS-REFERENCE TO RELATED APPLICATIONS

This application claims priority to Japanese Patent Application No. 2009-291819 filed on Dec. 24, 2009. The entire disclosure of Japanese Patent Application No. 2009-291819 is hereby incorporated herein by reference.

BACKGROUND

1. Technical Field

The present invention relates to an infrared detection circuit, a sensor device, and an electronic instrument.

2. Related Art

A known conventional infrared detection circuit uses a pyroelectric element. A human body emits infrared radiation at wavelengths in a vicinity of 10 μm, and the conventional infrared detection circuit can detect the existence of a person or acquire temperature information regarding a person in a non-contact fashion by detecting such radiation. Thus, this kind of infrared detection circuit can be used to detect intruders and to measure physical quantities.

A conventional infrared detection circuit disclosed in Japanese Laid-Open Patent Publication No. 59-142427 is configured to read a pyroelectric current from a pyroelectric element while cyclically exposing and interrupting the exposure of the pyroelectric element to an infrared radiation by using a mechanical chopper.

Another conventional infrared detection circuit disclosed in Japanese Laid-Open Patent Publication No. 2006-3301 is a dielectric barometer type detection circuit not requiring a chopper. This detection circuit utilizes a change of a capacitance value of a capacitor caused by a temperature increase resulting when the detection circuit is exposed to infrared radiation.

Another conventional infrared detection circuit disclosed in Japanese Laid-Open Patent Publication No. 2008-26249 serves to read a charge a plurality of times in order to increase a sensitivity and it includes an integration circuit comprising an operational amplifier, a reset switch, and an integration capacitor. Also included are four switches and a capacitor (pyroelectric element) configured such that its capacitance value changes in accordance with an amount of infrared radiation it is exposed to.

SUMMARY

Each of these conventional technologies has some disadvantages such as requiring a mechanical chopper and/or having difficulty detecting infrared radiation with a high degree of sensitivity.

With several aspects of the present invention, an infrared detection circuit, a sensor device, and an electronic instrument can be provided which can detect infrared radiation with a high sensitivity.

One aspect of the present invention relates to an infrared detection circuit that includes a charge transferring transistor, a gate control circuit and a negative potential generating circuit. The charge transferring transistor is disposed between a tank node and a read node configured to be connected to one end of an infrared detection element to transfer an electric charge from the infrared detection element to the tank node. The gate control circuit is connected to a gate of the charge transferring transistor. The negative potential generating circuit is connected to the tank node to set the tank node to a negative electric potential when the charge transferring transistor transfers the electric charge.

In this aspect of the present invention, the charge transferring transistor is provided between the tank node and the read node connected to the infrared detection element, and the gate of the charge transferring transistor is controlled by the gate control circuit. Meanwhile, the negative potential generating circuit serves to set the tank node to a negative electric potential. Since the tank node is set to a negative electric potential when an electric charge is transferred by the charge transferring transistor, the charge from the infrared detection element can be transferred to the tank node in an efficient manner. Also, the voltage applied to the infrared detection element can be increased such that the sensitivity of the infrared detection can be increased.

In this aspect of the present invention, it is acceptable if the gate control circuit outputs a prescribed gate control voltage corresponding to a threshold voltage of the charge transferring transistor to the gate of the charge transferring transistor.

In this way, the charge transferring transistor is set to a weak on-state such that an electric charge can be transferred to the tank node from the infrared detection element.

In this aspect of the present invention, it is also acceptable to include a reset circuit that is provided between the read node and a first power supply node to reset the read node to a first voltage level equal to a voltage level of the first power supply node during a reset period.

In this way, a preparation for reading an electric charge from the infrared detection element can be made by means of the reset circuit resetting the read node to the first voltage level.

In this aspect of the present invention, it is also acceptable if the gate control circuit is configured to turn on the charge transferring transistor after the negative potential generating circuit has set the tank node to a negative electric potential and before a voltage application node at another end of the infrared detection element changes from a first voltage level to a second voltage level.

In this way, the charge transfer transistor turns on after the tank node has been set to a negative electric potential, and, afterward, the voltage application node on the other end of the infrared detection element is changed to the second voltage level. As a result, an operation of reading the electric charge from the infrared detection element can be accomplished in an efficient manner.

In this aspect of the present invention, it is also acceptable if the negative potential generating circuit includes a first negative potential generating capacitor having a first end connected to the tank node and if the first negative potential generating capacitor also serves as a tank capacitor connected to the tank node.

Thus, since the first negative potential generating capacitor can also be used as a tank capacitor, the scale of the circuit can be reduced.

In this aspect of the present invention, it is also acceptable if the negative potential generating circuit includes a second negative potential generating capacitor having a first end connected to the tank node and if a second end of the second negative potential generating capacitor outputs a voltage equal to the negative electric potential of the tank node converted to a positive electric potential.

Thus, since the second negative potential generating capacitor can be used as a level shifter, the scale of the circuit can be reduced.

In this aspect of the present invention, it is also acceptable if the negative potential generating circuit includes a first negative potential generating capacitor having a first end connected to the tank node, a second negative potential generating capacitor having a first end connected to the tank node and a larger capacitance value than the first negative potential generating capacitor, a first driver configured to drive a second end of the first negative potential generating capacitor, and a second driver configured to drive a second end of the second negative potential generating capacitor. When the tank node is set to a negative electric potential, the first driver changes a voltage level of the second of the first negative potential generating capacitor from a second voltage level to a first voltage level and the second driver changes a voltage level of the second end of the second negative potential generating capacitor from the second voltage level to the first voltage level. After the voltage level of the second end of the second negative potential generating capacitor has been changed to the first voltage level, the second driver sets the voltage level of the second end of the second negative potential generating capacitor to a high impedance state.

In this way, the tank node can be set to a negative electric potential by using the first and second drivers to change the second ends of the first and second negative potential generating capacitors from the second voltage level to the first voltage level. Then, afterwards, a voltage equal to the negative electric potential of the tank node converted to a positive electric potential can be outputted from the second end of the second negative potential generating capacitor by setting the second end of the second negative potential generating capacitor to a high impedance state.

In this aspect of the present invention, it is also acceptable if the infrared detection circuit includes a control transistor provided between the read node and the charge transferring transistor so that a detection voltage is acquired from the tank node after the control transistor has executed an operation of turning on and off a plurality of times.

In this way, the sensitivity of the infrared detection can be increased by executing an electric charge reading operation a plurality of times.

In this aspect of the present invention, it is also acceptable if the infrared detection circuit includes a tank capacitor having one end connected to the tank node and a capacitance value of the tank capacitor is at least N times larger than a capacitance value of the infrared detecting element, where N is a number of times the control transistor executes an operation of turning on and off.

In this way, a situation in which a detection voltage of the tank node becomes saturated can be prevented.

In this aspect of the present invention, it is also acceptable if the control transistor is configured to execute the operation of turning on and off so that a voltage level of a voltage application node at another end of the infrared detection element is changed from a first voltage level to a second voltage level during a period when the control transistor is on and, after the voltage application node has been changed to the second voltage level, the control transistor turns off and the voltage application node is changed from the second voltage level to the first voltage level during a period while the control transistor is off.

In this way, a situation in which a change of the voltage level of the voltage application node has an ill effect on the tank node can be prevented.

In this aspect of the present invention, it is also acceptable if the infrared detection circuit further includes a reset circuit connected to the read node to reset a voltage level of the read node to the first voltage level during a period when the control transistor is off.

In this way, a situation in which a change of the voltage level of the read node has an ill effect on the tank node can be prevented.

In this aspect of the present invention, it is also acceptable if the infrared detection circuit includes a feedback inverter circuit configured to invert an electric potential change of a node located on a different side of the charge transferring transistor than the tank node and to output the inverted electric potential change to the gate of the charge transferring transistor.

With this aspect, a read operation having a higher amplification degree can be accomplished by controlling the gate of the charge transferring transistor with the feedback inverter circuit.

Another aspect of the present invention relates to a sensor device that includes a sensor array, one or more row lines, one or more column lines, a row selecting circuit and a read circuit. The sensor array includes a plurality of sensor cells arranged in an array. The row selecting circuit is connected to the one or more row lines. The read circuit is connected to the one or more column lines. Each of the sensor cells includes an infrared detection element and a selecting transistor that is provided between the infrared detection element and a corresponding one of the one or more column lines with a gate of the selecting transistor being controlled by a corresponding one of the one or more row lines. The read circuit includes one or more infrared detection circuits respectively connected to the one or more column lines. Each of the infrared detecting circuits includes a charge transferring transistor, a gate control circuit, and a negative potential generating circuit. The charge transferring transistor that is provided between a tank node and a node of a corresponding one of the one or more column lines to transfer an electric charge from the infrared detection element to the tank node. The gate control circuit is connected to a gate of the charge transferring transistor. The negative potential generating circuit is connected to the tank node to set the tank node to a negative electric potential when the charge transferring transistor transfers the electric charge.

According to this aspect of the present invention, an infrared detection element and a selecting transistor are provided in each of the sensor cells of the sensor array and a charge transferring transistor, a gate control circuit, and a negative potential generating circuit are provided in the read circuit of the sensor array. Since the tank node is set to a negative electric potential when an electric charge is transferred by the charge transferring transistor, the charge from the infrared detecting element can be transferred to the tank node in an efficient manner. Also, the voltage applied to the infrared detection element can be increased such that the sensitivity of the infrared detection can be increased.

Still another aspect of the present invention relates to an electronic instrument that includes any of the infrared detection circuits described above.

Still another aspect of the present invention relates to an electronic instrument that includes the sensor device described above.

BRIEF DESCRIPTION OF THE DRAWINGS

Referring now to the attached drawings which form a part of this original disclosure.

DETAILED DESCRIPTION OF EXEMPLARY EMBODIMENTS

A preferred embodiment of the present invention will now be explained in detail. The embodiment explained hereinafter does not unduly limit the content of the present invention as presented in the claims, and not all of the constituent features explained in the embodiments are essential for achieving the object of the present invention.

1. Comparative Example

In order to facilitate understanding of the embodiments according to the present invention, some comparative examples of infrared detection circuits will be explained with reference to FIGS. 1A, 1B and 1C.

Figure 1A:
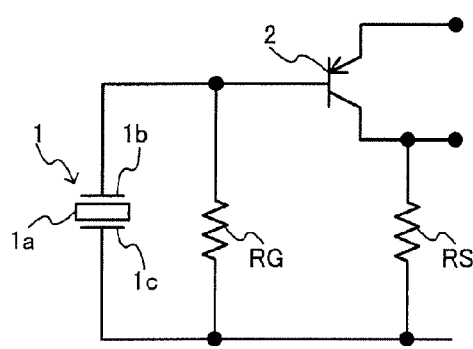
FIGS. 1A, 1B, and 1C are circuit diagrams for explaining comparative examples of infrared detection circuits.

FIG. 1A shows a first comparative example of the infrared detection circuit that is configured to read a pyroelectric current from a pyroelectric element 1 while cyclically exposing and interrupting the exposure of the pyroelectric element 1 to an infrared radiation by using a mechanical chopper. When the infrared radiation strikes the pyroelectric element 1, a temperature change occurs in a dielectric 1a and a magnitude of a spontaneous polarization changes. Since a surface charge cannot change as quickly as the spontaneous polarization, a residual surface charge occurs. Thus, a current corresponding to the residual surface charge flows through a resistor RG connected between electric poles 1b and 1c of the pyroelectric element 1 and a voltage develops across the resistor RG. This voltage is detected using a circuit comprising a transistor 2 and a resistor RS.

Since the chopper used in the detection circuit shown in FIG. 1A is mechanical, the detection circuit incurs such challenges as a poor stability of a chopping frequency, a need to synchronize between the chopper and the FPA, and a short service life of the chopper.

Figure 1B:
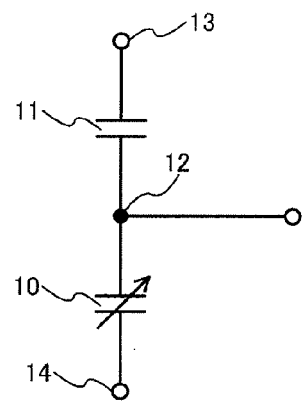

FIG. 1B shows a second comparative example of the infrared detection circuit. Unlike the circuit shown in FIG. 1A, this is a dielectric barometer type detection circuit not requiring a chopper. This detection circuit utilizes a change of a capacitance value of a capacitor 10 caused by a temperature increase resulting when the detection circuit is exposed to infrared radiation. Since the capacitance value cannot be detected directly, a capacitor 10 that changes in response to temperature and a reference capacitor 11 that does not change in response to temperature are connected together in series. A voltage is applied across two end terminals 13 and 14 of the two capacitors 10 and 11 connected in series and a slight capacitance value change is detected by reading a voltage change occurring at an intermediate terminal 12.

However, with the first and second comparative examples of the infrared detection circuits, it is difficult to achieve a higher degree of infrared detection sensitivity because the change with respect to temperature of the pyroelectric current or the permittivity is very small.

Figure 1C:
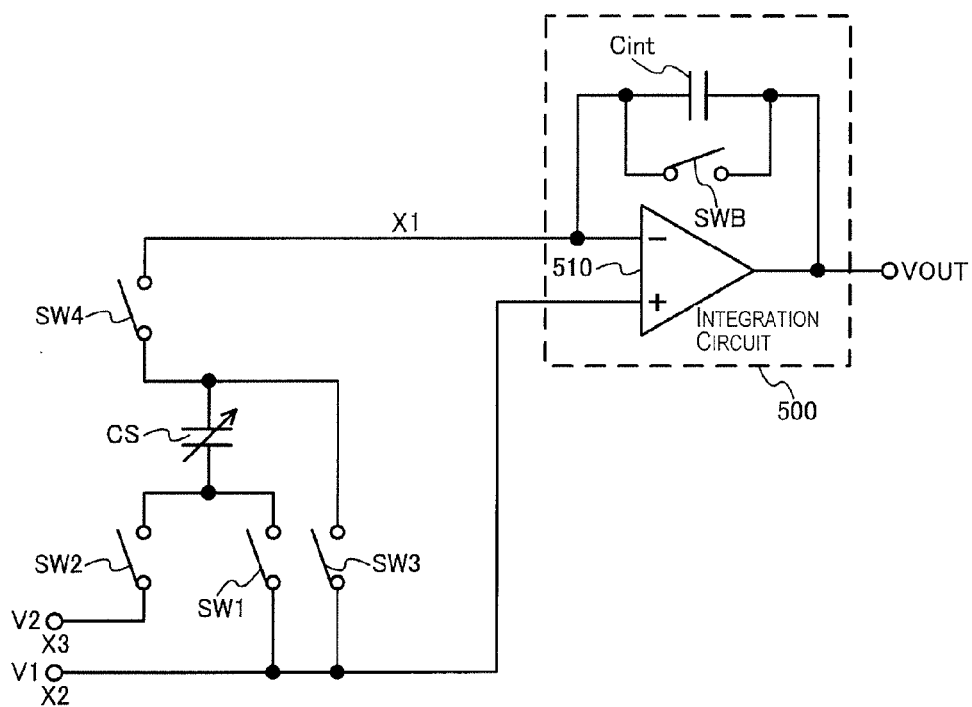

FIG. 1C shows a third comparative example of the infrared detection circuit. This detection circuit is configured to achieve an improved sensitivity, which the circuits shown in FIGS. 1A and 1B do not achieve. This detection circuit serves to read a charge a plurality of times in order to increase a sensitivity and it includes an integration circuit 500 comprising an operational amplifier 510, a reset switch SWB, and an integration capacitor Cint. Also included are some switches SW1 to SW4 and a capacitor CS (pyroelectric element) configured such that its capacitance value changes in accordance with an amount of infrared radiation it is exposed to.

The switches SW1 and SW4 turn on and off in synchronization with each other, and the switches SW2 and SW3 turn on and off in synchronization with each other. Also, the switches SW2 and SW3 turn off when the switches SW1 and SW4 turn on, and the switches SW2 and SW3 turn on when the switches SW1 and SW4 turn off. A bias fixing voltage V1 is applied to a terminal X2 and a drive voltage V2 different from the voltage V1 is applied to a terminal X3.

When the switches SW2 and SW3 turn on from an initial state in which the integration capacitor Cint does not have a stored charge, a voltage difference V2−V1 between the drive voltage V2 of the terminal X3 and the fixed bias voltage V1 of the terminal X2 is applied to across both terminals of a sensor capacitor CS. As a result, a charge QS develops in the sensor capacitor CS, where QS=CS(V2−V1).

When the switches SW2 and SW3 turn off and the switches SW1 and SW4 turn on, the charge stored in the sensor capacitor CS is transferred to and stored in the integration capacitor Cint. When this occurs, a charge having the same magnitude but the opposite polarity as a charge stored at the node X2 is outputted from the operational amplifier 510 and stored in the integration capacitor Cint. As a result, the output voltage VOUT=QS/Cint+V1. Incidentally, the capacitance values of the capacitors are indicated using the same reference symbols as the names of the capacitors in order to simplify the explanation.

By repeating the operation of reading the electric charge a plurality of times, the detection circuit shown in FIG. 1C improves a S/N ratio and detects infrared radiation with a higher sensitivity.

However, the detection circuit shown in FIG. 1C has four problems that will now be explained.

Firstly, although a voltage V2−V1 is applied across the sensor capacitor CS during charging, only a portion of the voltage, i.e., a voltage in accordance with a voltage division ratio of the capacitors Cint and CS, is applied during reading. Thus, for example, a voltage of approximately VCC/2 is all that is applied across the capacitor CS during reading. Consequently, the amount of electric charge stored in and read from the sensor capacitor CS is smaller than if the full amount of the voltage VCC were applied. As a result, the sensitivity of the infrared detection is lower than if the full amount of the voltage VCC were applied.

Secondly, in the circuit shown in FIG. 1C, a parasitic capacitance (junction capacitance) exists in the switches SW1 to SW4, which are, for example, NMOS transistors. Consequently, the capacitance value selected for the integration capacitor Cint, which serves as a reference capacitor, is not completely accurate. Thus, when the voltage applied to the sensor capacitor CS is even smaller and the sensitivity of the infrared detection is lower than it would be. Particularly in the case of a FPA, there is one integration circuit 500 provided for each column of the array, and the number of switches SW4 hanging from the node X1 is equal to the number of rows of the array. In such a case, since the junction capacitance of the switches SW4 is large, it is difficult to achieve an appropriate voltage across the sensor capacitor CS during reading due to the effect of the voltage division ratio.

Thirdly, since it is necessary to arrange the sensor capacitor CS and the four switches SW1 to SW4 shown in FIG. 1 into each sensor cell (each pixel) of the sensor array of the FPA, the circuit is not well suited for narrowing the pitch of the sensor cells, i.e., the pixel pitch.

Fourthly, switching noise from the four switches SW1 to SW4 sometimes causes adverse effects and the switch timings of the switches SW1 to SW4 easily become offset from one another.

2. First Embodiment

Figure 2:
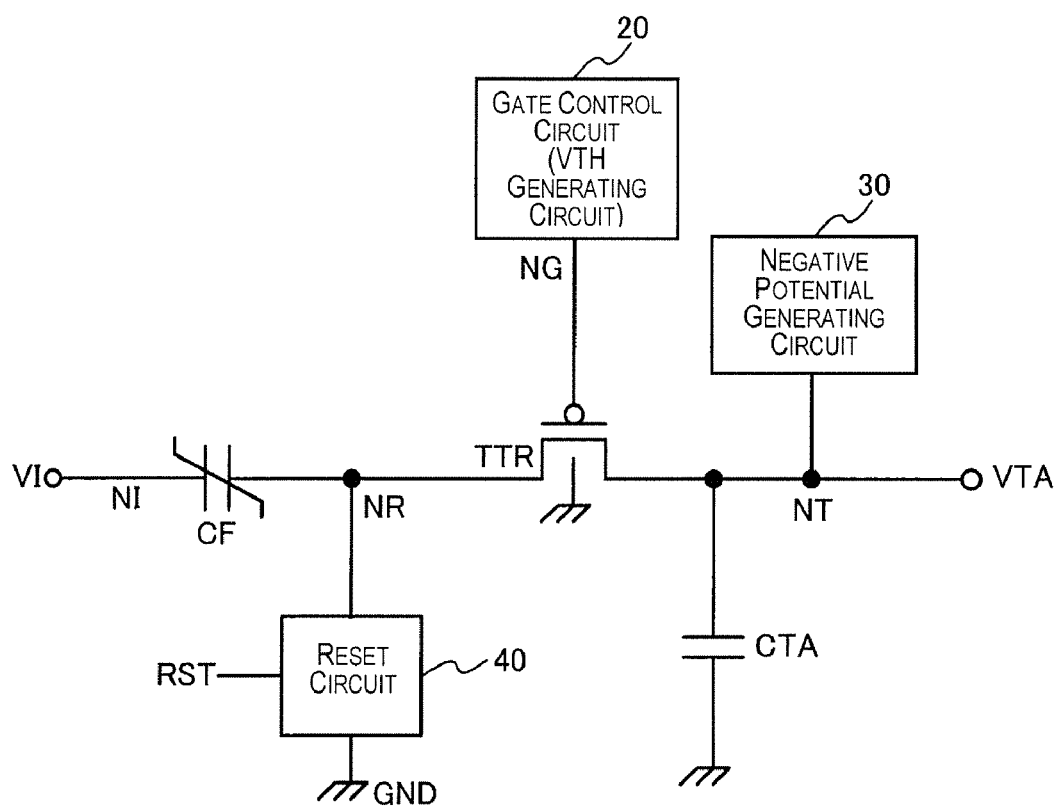
FIG. 2 is a diagram of an infrared detection circuit according to a first embodiment.

FIG. 2 shows an infrared detection circuit according to a first embodiment that can resolve the problems enumerated above. As shown in FIG. 2 the detection circuit includes a charge transferring transistor TTR, a gate control circuit 20, and a negative potential generating circuit 30. A reset circuit 40 and a tank capacitor CTA can also be included. A detection circuit according to this embodiment is not limited to the constituent features shown in FIG. 2. Various changes can be made. For example, a portion of the components (e.g., the reset circuit and the tank capacitor) can be removed and/or other components can be added.

The infrared detecting element CF (pyroelectric element or heat detecting element) is an element for detecting infrared radiation and serves to detect an energy amount of an infrared radiation by detecting a temperature change caused by the infrared radiation. The infrared detection element CF comprises, for example, a pyroelectric material (pyroelectric film) having a first electrode and a second electrode attached at both ends so as to sandwich the pyroelectric material in-between. The pyroelectric material is, for example, a film made of PZT (lead zirconate titanate) or other ferroelectric substance and exhibits spontaneous polarization. An amount of spontaneous polarization exhibited by the infrared detection element CF changes depending on temperature. For example, the amount of spontaneous polarization decreases when the temperature increases due to exposure to infrared radiation. A capacitance value of the infrared detection element CF also changes depending on temperature. For example, the capacitance value of the infrared detection element CF increases when the temperature increases due to incident infrared radiation. Thus, the infrared detection element CF is an element (sensor) whose polarization amount and capacitance value change when it is exposed to heat (infrared energy).

The transferring transistor TTR is provided between a read node NR at one end of the infrared detection element CF and a tank node NT (charge storage node). The transferring transistor TTR serves to transfer an electric charge from the infrared detection element CF to the tank node NT. The transferring transistor TTR is, for example, a P-type transistor (PMOS transistor) having a source connected to the read node NR, a drain connected to the tank node NT, and a gate connected to a gate node NG. A back gate (substrate) of the transferring transistor TTR is connected (set) to, for example, a ground GND.

A voltage application node NI is provided at the other end of the infrared detection element CF, and a voltage VI is applied to the voltage application node NI from a voltage applying circuit (not shown). The voltage VI is, for example, 0 V (more broadly called a first voltage level) or the voltage VCC (more broadly called a second voltage level).

The gate control circuit 20 (threshold voltage generating circuit) controls the gate of the charge transferring transistor TTR. For example, if a threshold voltage of the charge transferring transistor TTR is to be set to −VTH, then the gate control circuit 20 generates a gate control voltage corresponding to the voltage −VTH and sends the generated voltage to the gate of the charge transferring transistor TTR. The gate control voltage corresponding to the threshold voltage −VTH is, for example, a voltage equal to a threshold voltage of a P-type transistor that is similar to the charge transferring transistor TTR. The gate control voltage (−VTH) outputted from the gate control circuit 20 is substantially equal to the threshold voltage of the charge transferring transistor TTR, but it is acceptable if the gate control voltage is slightly different from the threshold voltage of the transistor TTR due to variations in a manufacturing process.

The negative potential generating circuit 30 (negative potential setting circuit) is configured to execute a potential control of the tank node NT so as to set the tank node NT to a negative electric potential. For example, the negative potential generating circuit 30 sets the tank node NT to a negative electric potential when the charge transferring transistor TTR is transferring an electric charge. It sets the tank node NT to, for example, the negative electric potential −VCC.

The reset circuit 40 serves to reset the read node NR. More specifically, the reset circuit 40 is provided between the read node NR of the infrared detection element CF and a ground node GND (more broadly called a first power supply node). During a reset period, the voltage level of the read node NR is reset (set) to 0 V (i.e., the first voltage level), which is the voltage level of the ground node GND.

Figure 9:
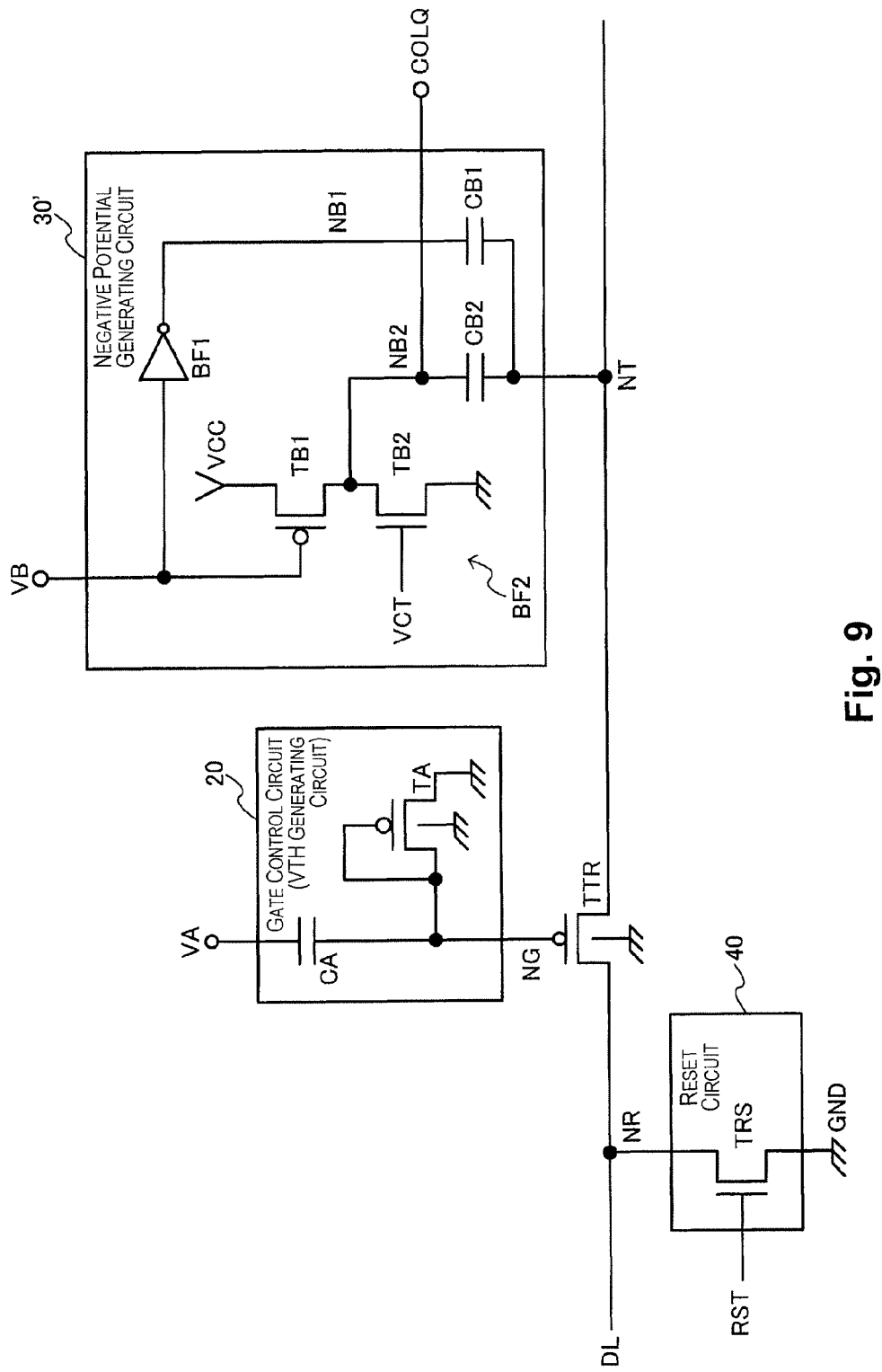
FIG. 9 is a diagram of an infrared detection circuit including a detailed diagram of an alternative example of the negative potential generating circuit according to the second embodiment.

One end of the tank capacitor CTA is connected to the tank node NT. The other end of the tank capacitor CTA is connected to, for example, the ground node GND. A capacitance value of the tank capacitor CTA is, for example, larger than a capacitance value of the infrared detection element CF. For example, if the electric charge reading operation is executed N times (where N is an integer equal to or larger than 2), then the capacitance value of the tank capacitor CTA is preferably at least N times larger than the capacitance value of the infrared detection element CF. It is also acceptable to arrange for a capacitor provided in the negative potential generating circuit 30 or another circuit to be used dually as the tank capacitor CTA. For example, it is also acceptable for the tank capacitor CTA to be a capacitor provided in another circuit, such as a negative potential generating circuit 30' as shown in FIG. 9, which will be explained in more detail below.

With the infrared detection circuit shown in FIG. 2, the charge transferring transistor TTR is turned on after the negative potential generating circuit 30 has set the tank node NT to a negative potential. That is, the gate control circuit 20 turns the charge transferring transistor TTR on. After the charge transferring transistor TTR is turned on, the voltage level of the voltage application node NI on the other end of the infrared detection element CF is changed from 0 V (more broadly called a first voltage level) to VCC (more broadly called a second voltage level). In other words, the voltage application circuit (not shown) changes the voltage level of the voltage application node NI from 0 V to VCC. In this way, an infrared detection circuit having a high detection sensitivity with respect to infrared radiation can be realized.

Figure 3:
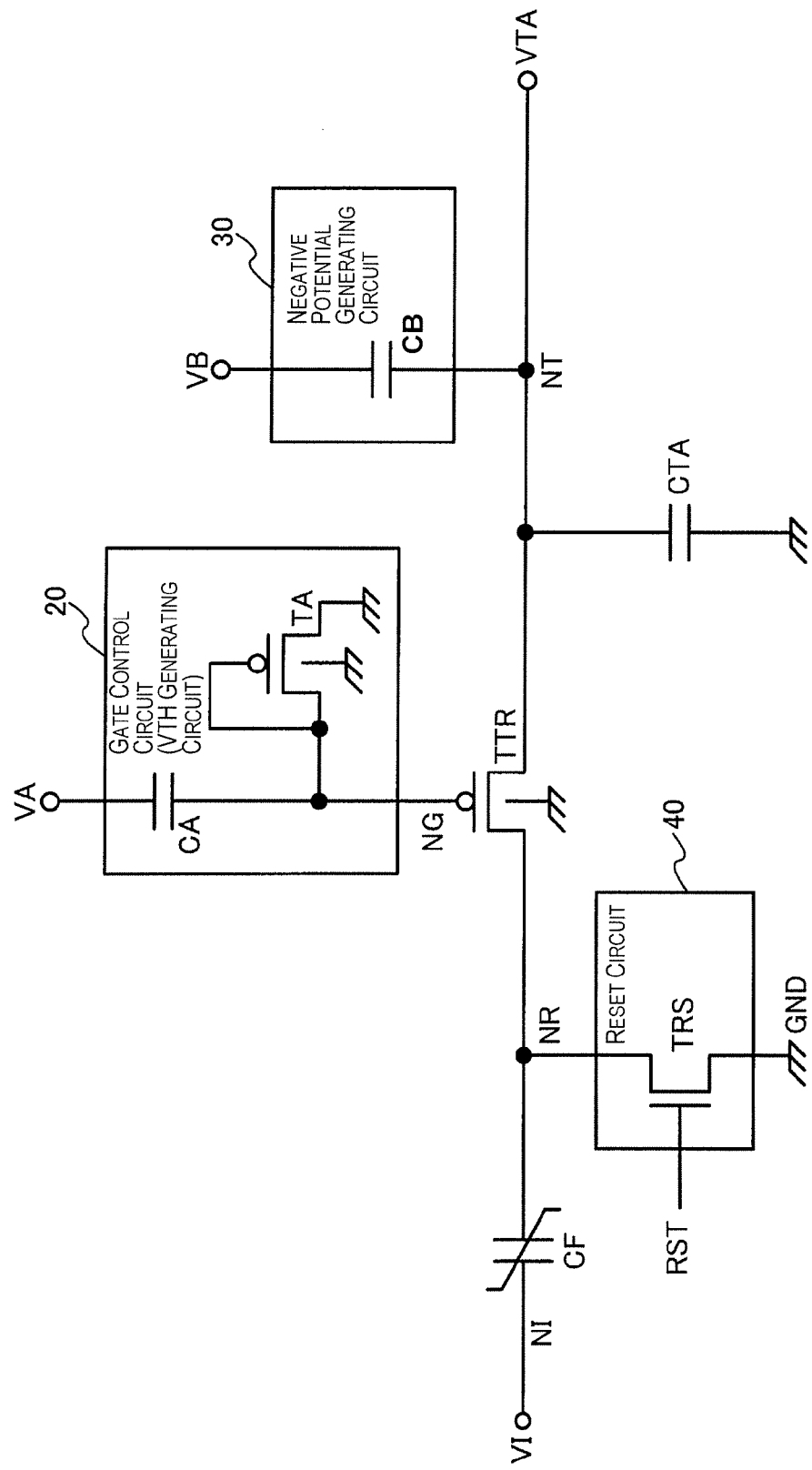
FIG. 3 is a diagram of the infrared detection circuit including detailed diagrams of a gate control circuit, a negative potential generating circuit, and a reset circuit according to the first embodiment.

FIG. 3 shows detailed diagrams of the gate control circuit 20, the negative potential generating circuit 30, and the reset circuit 40. However, the constituent features of the gate control circuit 20, the negative potential generating circuit 30, and the reset circuit 40 are not limited to those shown in FIG. 3 and numerous variations are possible.

The gate control circuit 20 includes a transistor TA for generating a voltage VTH (threshold voltage) and a capacitor CA for generating a negative electric potential. The VTH generating transistor TA is a P-type transistor having a source connected to ground GND and a gate and a drain connected to a gate node NG. A back gate (substrate) of the transistor TA is connected (set) to, for example, a ground GND. One end of the negative potential generating capacitor CA is connected to the gate node NG and the other end is set to a negative potential generating voltage VA.

When, for example, the voltage VA changes from VCC (the second voltage level) to 0 V (the first voltage level), the electric potential of the gate node NG changes toward a negative potential. More specifically, the gate node NG is set to the voltage level –VTH because the gate node NG is connected to the transistor TA, which is a P-type diode-connected transistor. Thus, the gate node NG is set to a voltage level that is substantially equal to the threshold voltage of the transistor TA. Since the transistor TA and the charge transferring transistor TTR are both P-type transistors with similar structures, the gate node NG is set to a voltage level that is negative but has substantially the same magnitude as the threshold voltage of the charge transferring transistor TTR.

The negative potential generating circuit 30 includes a capacitor CB for generating a negative potential. One end of the negative potential generating capacitor CB is connected to the tank node NT and the other end is set to a negative potential generating voltage VB. When, for example, the tank node NT is in a high impedance state, the electric potential of the tank node NT is changed toward a negative electric potential, e.g., –VCC, by changing the negative potential generating voltage VB from VCC (the second voltage level) to 0 V (the first voltage level).

The reset circuit 40 includes a reset transistor TRS that is an N-type transistor. When a reset signal RST is set to an H level (active), the reset transistor TRS turns on and the read node NR is reset to 0 V.

Figure 4:
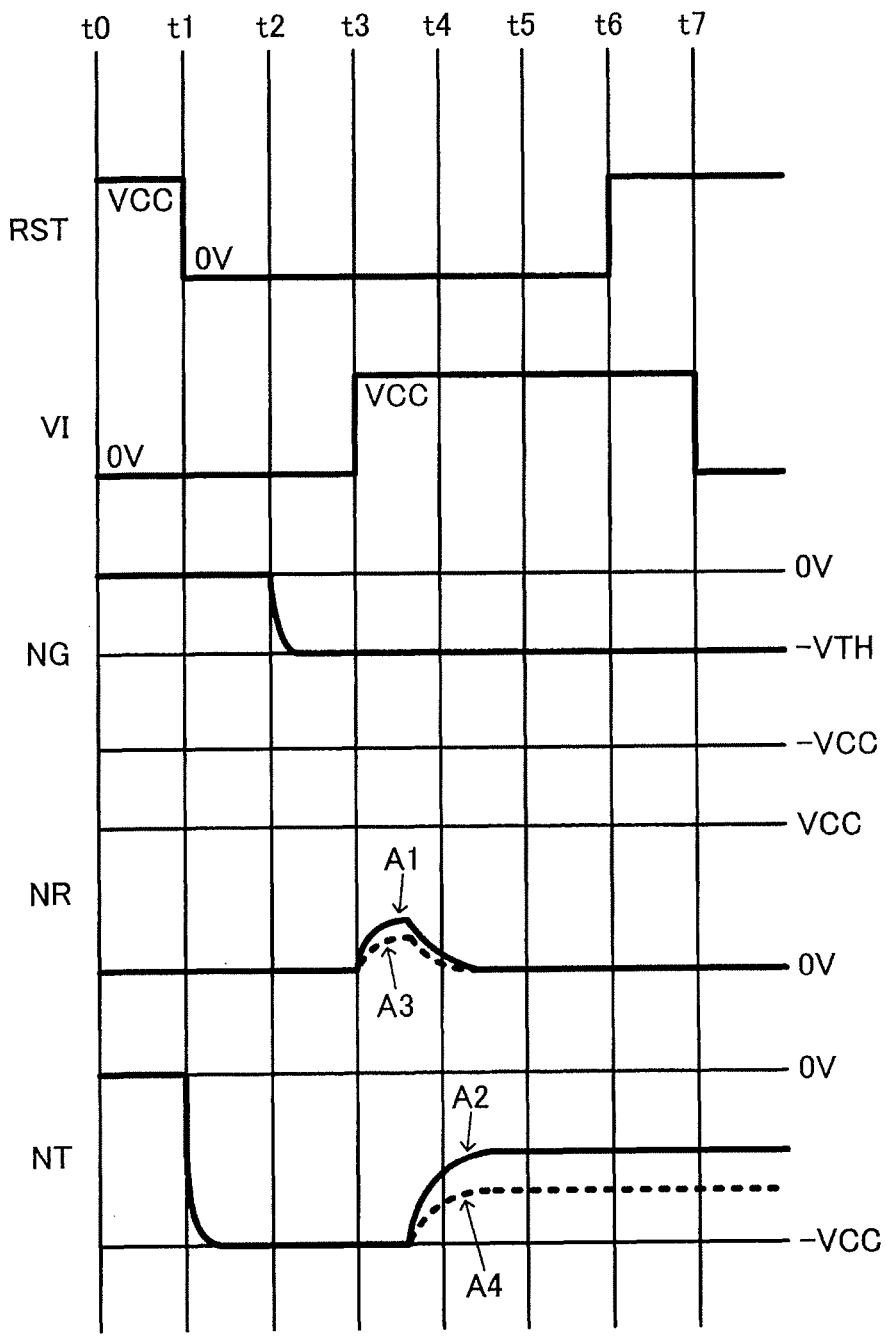
FIG. 4 is a time chart showing an example of signal waveforms for explaining the operation of the infrared detection circuit according to the first embodiment.

The signal waveforms shown in FIG. 4 will now be used to explain the operation of a detection circuit according to the first embodiment. Control timings of the reset signal RST, the voltage V1 applied to the voltage application node NI, the voltage applied to the gate node NG, and the voltage applied to the tank node NT are controlled as shown in FIG. 4 by a control unit (not shown), which is operatively coupled to the reset circuit 40, the voltage applying circuit connected to the voltage application node NI, the gate control circuit 20 and the negative potential generation circuit 30.

At a time t1 shown in FIG. 4, the reset signal RST is set to 0 V and the read node NR is set to a floating state. Also, at the time t1, the negative potential generating circuit 30 sets the tank node NT to a negative potential close to –VCC.

At a time t2, the gate control circuit 20 sets the gate node NG to the voltage –VTH, which corresponds to the threshold voltage of the charge transferring transistor TTR. As a result, the charge transferring transistor TTR is set to a weak on-state.

At a time t3, the voltage V1 is raised from 0 V to VCC. As a result, a charge corresponding to a polarization amount (capacitance) is read from the infrared detection element CF and the electric potential of the read node NR increases as shown in FIG. 4 A1. When the electric potential of the read node NR increases, the electric charge is transferred to the tank node NT through the weakly on charge transferring transistor TTR. Then, as shown in A2, the voltage VTA of the tank node NT increases according to the transferred electric charge and, simultaneously, the electric potential of the read node NR decreases to a voltage near 0 V. In other words, all of the electric charge read from the infrared detection element CF is transferred to the tank node NT and the voltage VTA of the tank node changes according to the amount of infrared energy received by the infrared detection element CF.

Afterwards, at a time t6, the reset signal RST is set to VCC and the read ode is reset (discharged) to 0 V (GND). At a time t7, the voltage V1 is set to 0 V and the read operation is ended.

The curves A3 and A4 of FIG. 4 indicate the electric potential changes of the read node NR and the tank node NT, respectively, when the temperature is higher than in the case of the curves A1 and A2. As indicated by these curves, the spontaneous polarization of the infrared detection element CF declines when the infrared detection element is exposed to infrared radiation and its temperature rises. Consequently, the change amounts of the electric potentials of the read node NR and the tank node NT decrease as the temperature increases. Therefore, by measuring the voltage level of the node NT, the temperature of the infrared detection element CF can be measured and, thus, the amount of infrared energy can be measured.

Figure 5:
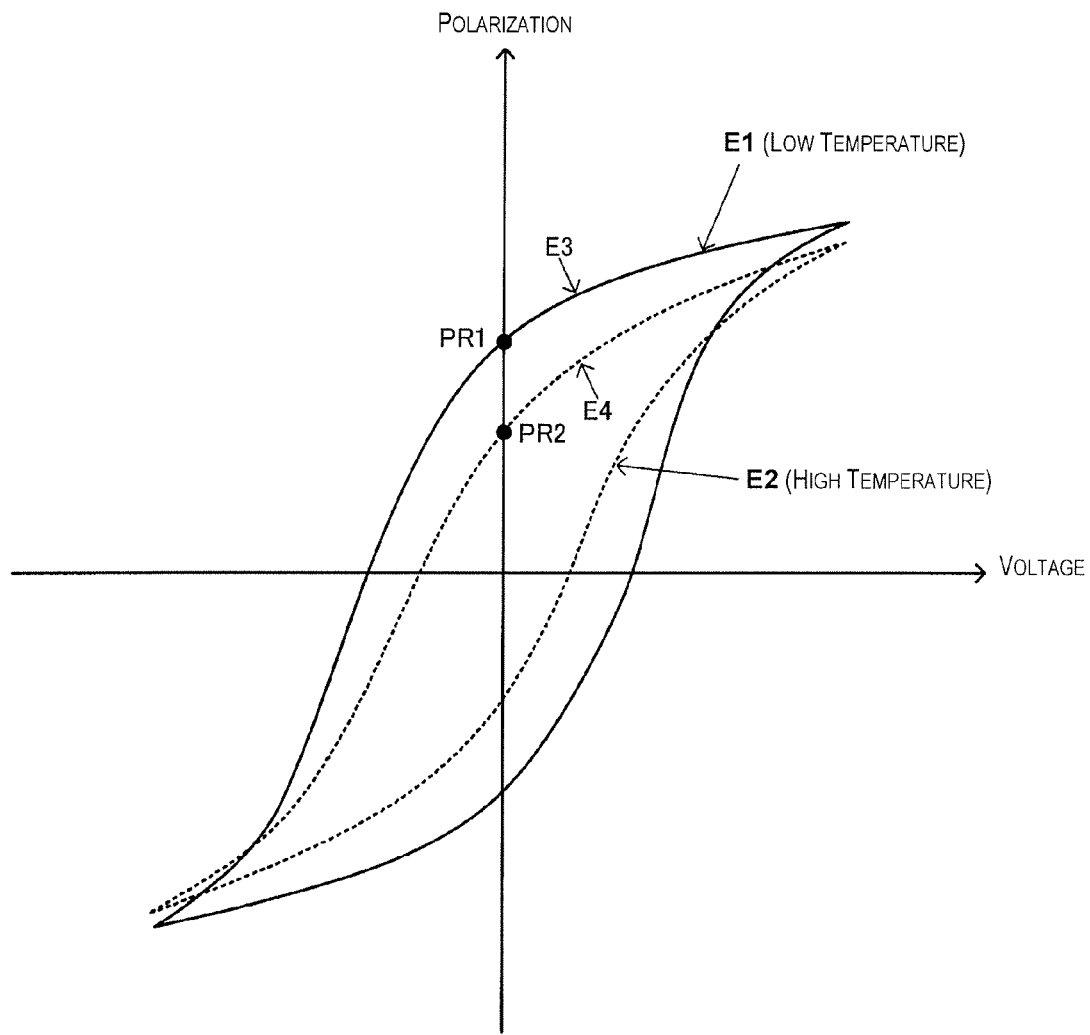
FIG. 5 is a graph showing an example of hysteresis loops of a pyroelectric element.

FIG. 5 shows an example of a hysteresis loop of the infrared detection element CF (pyroelectric element). In the figure, E1 is a hysteresis loop for a case in which the temperature is low and E2 is a hysteresis loop for a case in which the temperature is high. As shown in FIG. 5, a spontaneous polarization amount PR2 (residual polarity) occurring in the case of the higher temperature hysteresis loop is smaller than a spontaneous polarization amount PR1 occurring in the case of the lower temperature hysteresis loop.

The slopes of the hysteresis loops at any given voltage along the curves E3 and E4 depend on the size of the capacitance value (permittivity) of the infrared detection element CF. As indicated by E3 and E4, the slope of the higher temperature hysteresis loop is larger than the slope of the lower temperature hysteresis loop at any given voltage. Thus, an average capacitance value of the infrared detection element CF is larger when the temperature is higher.

With an infrared detection circuit according to the first embodiment described above, a larger amount of electric charge can be read because the full amount of the voltage VCC can be applied to the sensor capacitor, i.e., the infrared detection element CF. In the comparative example shown in FIG. 1C, a voltage equal to approximately VCC/2 is all that can be applied to the sensor capacitor CS and, thus, the amount of electric charge that can be read in one read operation is small. Conversely, with this embodiment, the full amount of the voltage VCC can be applied to the infrared detection element CF because the voltage of the read node NR goes to 0 V when the voltage V1 of the voltage application node NI is set to VCC. Consequently, the electric charge can be read as indicated by A1 and A3 in FIG. 4. Thus, a higher sensitivity can be achieved than with the comparative example shown in FIG. 1C.

Also, since a large number of switches SW1 to SW4 is required in the comparative example shown in FIG. 1C, the setting of the integration capacitor Cint becomes deviated from where it should be due to parasitic capacitances of the transistors used for the switches SW1 to SW4. Consequently, the voltage applied to the sensor capacitor CS is even smaller. In particular, when the infrared detection circuit is used in an FPA, the parasitic capacitance of the node X1 becomes large it is difficult to obtain an optimum value due to the effect of the resulting voltage division ratio. Furthermore, the comparative example incurs such problems as adverse effects caused by switching noise from the four switches SW1 to SW4 and the switch timings of the switches SW1 to SW4 being offset from one another. Conversely, with this embodiment, fewer switches are required than in the comparative example and the electric charge can be read from the infrared detection element CF with a simple control using the charge transferring transistor TTR. As a result, the problems incurred with the comparative example shown in FIG. 1C can be resolved.

In the comparative example shown in FIG. 1C, it is necessary to provide an integration circuit 500 and the electric power consumption is larger due to a steady-state current flowing in the integration circuit 500. Conversely, this embodiment does not require such an integration circuit and it can achieve a smaller electric power consumption because there it does not have a path for a steady-state current to flow.

In this embodiment, the reset circuit 40 sets the read node NR to 0 V at a time t1 shown in FIG. 4. At a time t2 occurring after the negative potential generating circuit 30 has set the tank node NT to a negative potential, the gate node NG is set to the voltage −VTH and the charge transferring transistor TTR turns on. At a time t3 occurring after the charge transferring transistor TTR turns on, the voltage V1 of the voltage application node NI changes from 0 V to VCC.

Thus, as explained previously, the full voltage VCC can be applied to the infrared detection element CF by setting the read node NR to 0 V. However, when this is done, it is difficult to read the electric charge of the infrared detection element CF if the tank node NT is at a positive electric potential. In this embodiment, since the negative potential generating circuit 30 sets the tank node NT to −VCC, the electric charge can be drawn from the infrared detection element CF and transferred to the tank node NT even though the read node NR is at 0 V.

When the read node NR is set to 0V and the tank node NT is set to −VCC, the gate node NG of the charge transferring transistor TTR is set to −VTH. Consequently, the charge transferring transistor TTR is set to a weak on-state. Thus, the read node NR can be prevented from being pulled to an electric potential below 0 V by the negative electric potential −VCC of the tank node NT. In other words, the electric potential of the read node NR can be held at 0 V and the electric potential of the tank node NT can be held at −VCC while the electric charge is transferred as is from the infrared detection element CF to the tank node NT through the potential transferring transistor TTR. In short, a stable and accurate charge reading operation can be accomplished.

3. Second Embodiment

Referring now to FIGS. 6A to 9, an infrared detection circuit in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 6A:
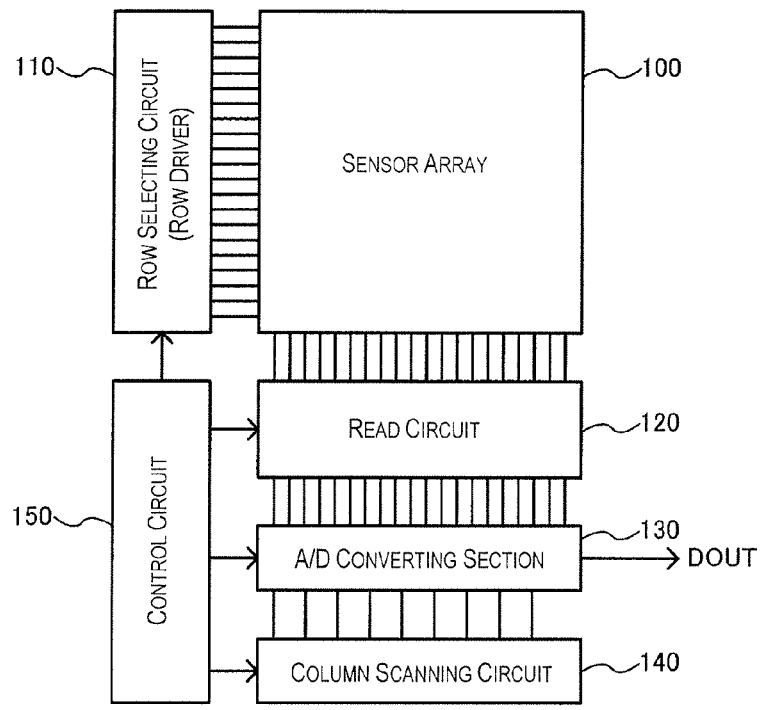
FIG. 6A is a diagram showing a sensor device in which an infrared detection circuits is equipped according to a second embodiment.

FIG. 6A shows a sensor device including an infrared detection circuit according to the second embodiment. This sensor device includes a sensor array 100, a row selecting circuit (row driver) 110, and a read circuit 120. It can also include an A/D converting section 130, a column scanning circuit 140, and a control circuit 150. This sensor device can be used to realize an infrared camera used in such devices as, for example, a night vision instrument.

The sensor array 100 (focal plane array) has a plurality of sensor cells arranged in an array form. The sensor array 100 also has a plurality of row lines (word lines or scan lines) and a plurality of column lines (data lines). It is acceptable for the number of row lines or the number of column lines to be one. For example, if the number of row lines is 1, then a plurality of sensor cells is arranged along the direction in which the row line spans (horizontal direction) in FIG. 6A. Meanwhile, if the number of columns is 1, then a plurality of sensor cells is arranged along the direction in which the column line spans (vertical direction) in FIG. 6A.

Figure 6B:
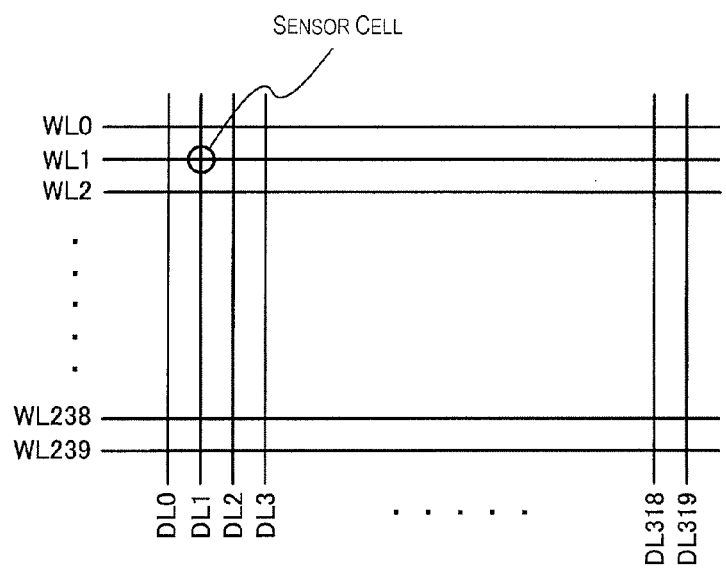
FIG. 6B is a diagram showing arrangement of a sensor array of the sensor device according to the second embodiment.

As shown in FIG. 6B, the sensor cells of the sensor array 100 are arranged (formed) in locations corresponding to positions where the row lines and the column lines intersect. For example, the sensor cell indicated in FIG. 6B is arranged in a location corresponding to a position where the row line WL1 intersects the column line DL1. The other sensor cells are formed in similar positions.

The row selecting circuit 110 is connected to the one row line or plurality of row lines. The row selecting circuit 110 then executes a selection operation with respect to each of the rows. Taking a QVGA (320×240 pixels) sensor array 100 (focal plane array) shown in FIG. 6B as an example, the row selecting circuit 110 selects (scans) each of the row lines WL0, WL1, SL2, . . . , WL239 sequentially. In other words, the row selecting circuit 110 sends a row line selecting signal (word selecting signal) to the sensor array 100. The row selecting circuit 110 includes a row driver that outputs a drive signal to drive lines that are provided in correspondence to the row lines.

The read circuit 120 (preamp) is connected to one or a plurality of column lines and is configured to execute a read operation with respect to each of the column lines. Taking the GVGA sensor array 100 as an example, the read circuit 120 executes a read operation with respect to a detection electric charge from each of the column lines DL0, DL1, DL2, . . . , DL319.

The A/D converting section 130 serves to convert a detection voltage (measured voltage or reached voltage) acquired by the read circuit 120 into digital data. After a voltage is converted by the A/D converting section 130, the digital data DOUT is outputted. More specifically, the A/D converting section 130 comprises a plurality of A/D converters, each provided with respect one of the column lines. Each of the A/D converters executes a processing to convert a detection voltage acquired by the read circuit 120 at the corresponding column line into digital data. It is acceptable either to provide one A/D converter with respect to each of the column lines or to use one A/D converter to A/D convert the detection voltages of a plurality of column lines in a time divided manner.

The column scanning circuit 140 is configured to output a column scanning signal to the A/D converting section 130. In response, the A/D converting section 130 outputs serial digital data DOUT. It is also possible to make a variation embodiment that does not have a column scanning circuit 140.

The control circuit 150 (timing generating circuit) generates various types of control signals and issues the control signals to the row selecting circuit 110, the read circuit 120, the A/D converting section 130, and the column scanning circuit 140. For example, the control circuit 150 generates and issues various timing control signals and circuit control signals in order to execute electric charge reading operations and voltage detections.

Figure 7A:
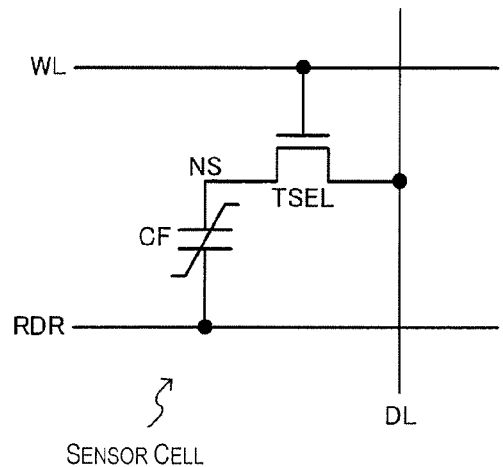
FIG. 7A is a diagram showing a sensor cell of the sensor device according to the second embodiment.
Figure 7B:
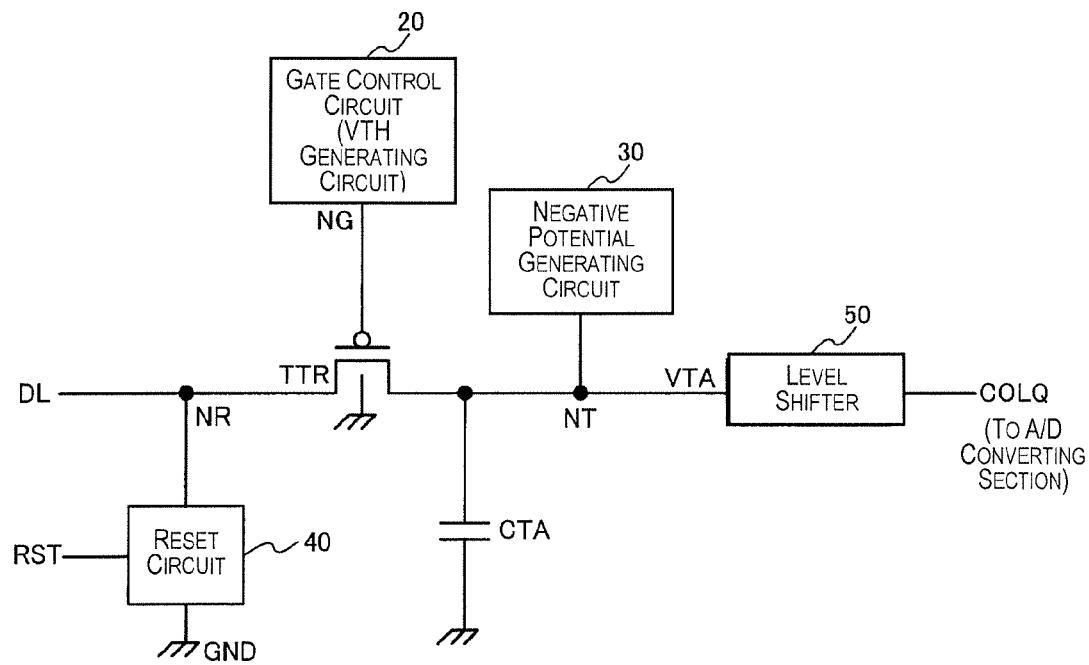
FIG. 7B is a diagram of the infrared detection circuit equipped in the sensor device according to the second embodiment.

FIG. 7A shows a configuration of sensor cells of a sensor array, and FIG. 7B shows an infrared detection circuit according to the second embodiment that is employed in this sensor device.

As shown in FIG. 7A, each of the sensor cells includes an infrared detection element CF and a selecting transistor TSEL (row selecting switch). That is, in the case of a QVGA (320× 240 pixels), there are 240 rows and 320 columns of sensor cells (pixels), each of which includes an infrared detection element CF and a selecting transistor TSEL.

As shown in FIG. 7A, the selecting transistor TSEL is provided between the node NS at one end of the infrared detection element CF and the one column line DL or the corresponding column line DL from among a plurality of column lines. A gate of the selecting transistor TSEL is controlled by the one row line WL or a corresponding row line WL from among a plurality of rows. Thus, when the corresponding row line WL becomes set to an H-level (active), the N-type selecting transistor TSEL turns on and the node NS at one end of the infrared detection element CF is connected to the corresponding column line DL.

The infrared detection circuit shown in FIG. 7B is provided in the read circuit 120 shown in FIG. 6A. That is, a corresponding infrared detection circuit configured as shown in FIG. 7B is provided in the read circuit 120 with respect to each of the one or plurality of column lines. The infrared detection circuit includes a charge transferring transistor TTR, a gate control circuit 20, and a negative potential generating circuit 30. Additionally, it can also include a reset circuit 40, a level shifter 50, and a tank capacitor CTA. It is also possible for a portion of these components to be omitted or other components to be added to obtain a variation of the embodiment.

The charge transferring transistor TTR is provided between the tank node NT and the node (read node NR) of the one column line DL or the corresponding column line DL among a plurality of column lines. An electric charge is transferred from the infrared detection element CF of the sensor cell shown in FIG. 7A to the tank node NT. The gate control circuit 20 controls the gate of the charge transferring transistor TTR, and the negative potential generating circuit 30 sets the tank node NT to a negative electric potential while the charge transferring transistor TTR is transferring an electric charge.

The reset circuit 40 serves to reset the read node NR, i.e., the node of the column line DL, to 0 V. The level shifter 50 converts the detection voltage VTA of the tank node NT from a negative potential to a positive potential. The voltage COLQ resulting from the conversion to a positive electric potential is sent to the A/D converting section 130 shown in FIG. 6A. By using the level shifter 50 to convert the detection voltage VTA of the tank node NT into a positive electric potential, the A/D conversion executed by the A/D converting section 130 can be simplified.

Figure 8:
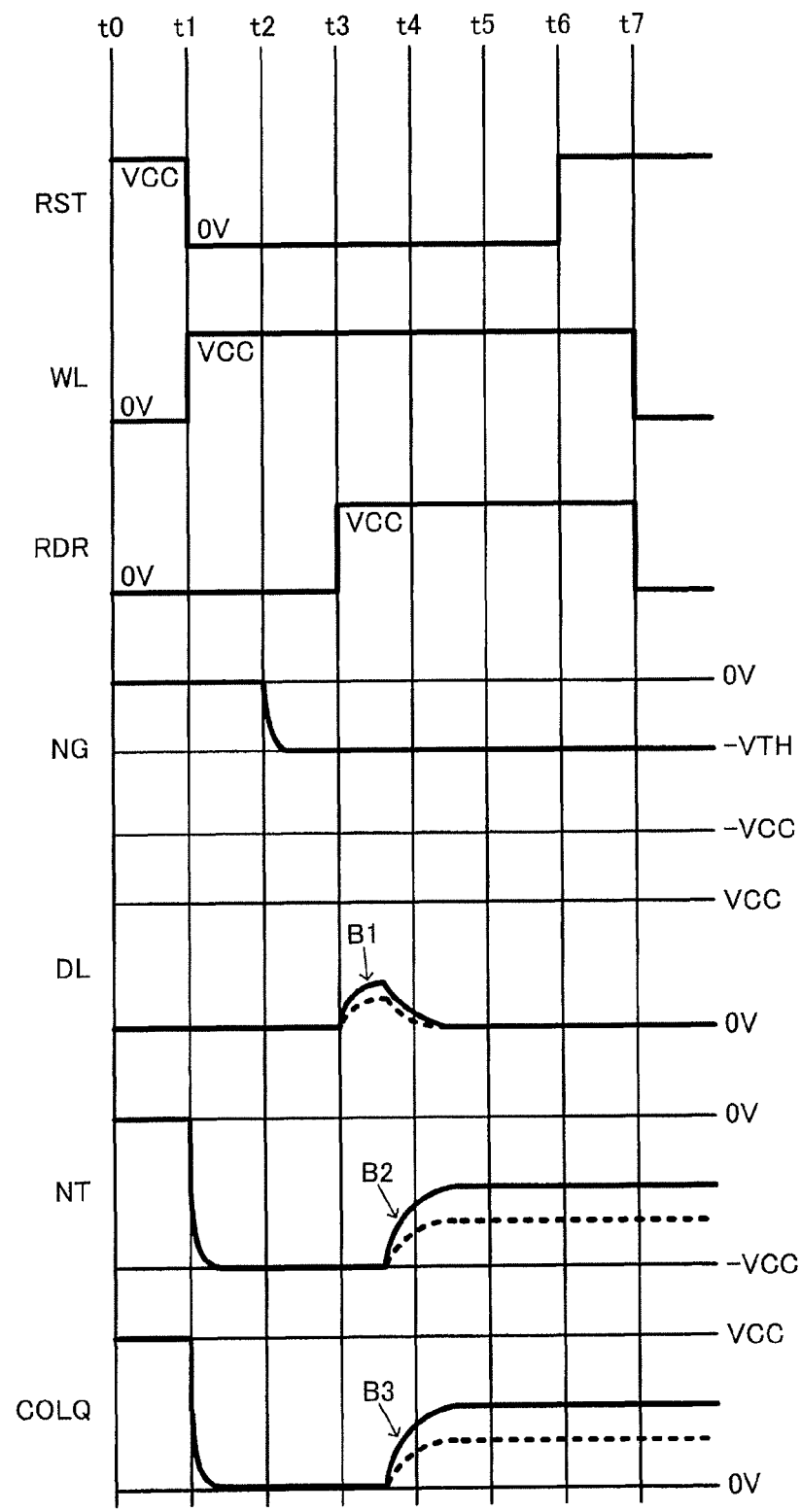
FIG. 8 is a time chart showing an example of signal waveforms for explaining the operation of the infrared detection circuit according to the second embodiment.

The signal waveforms shown in FIG. 8 will now be used to explain the operation of a detection circuit according to the second embodiment. Control timings of the reset signal RST, the voltage applied to the row line WL, the voltage applied to the drive line RDR, the voltage applied to the gate node NG, and the voltage applied to the tank node NT are controlled as shown in FIG. 8 by the control circuit 150.

At a time t1, the row selecting circuit 110 changes the row line WL from 0 V to the voltage VCC. In response, the selecting transistor TSEL shown in FIG. 7A turns on and selects a corresponding sensor cell. For example, if the row line WL0 is set to VCC, then the selecting transistors TSEL of all of the sensor cells connected to the row line WL0 turn on and the node NS located at one end of the infrared detection element CF contained in each of these sensor cells becomes electrically connected to a corresponding column line.

At a time t1, the negative potential generating circuit 30 of the detection circuit (read circuit) shown in FIG. 7A sets the tank node NT to the negative potential −VCC. At a time t2, the gate control circuit 20 sets the gate node NG of the charge transferring transistor TTR to the voltage −VTH.

At a time t3, the row driver of the row selecting circuit 110 changes the voltage setting of the drive line RDR from 0 V (first voltage level) to VCC (second voltage level). As a result, electric charge is read from the infrared detection element CF shown in FIG. 7A to the column line DL (read node NR) through the selecting transistor TSEL, which is on.

After the electric charge has been read as indicated by B1 in FIG. 8, the electric charge is transferred to the tank node NT through the weakly-on charge transferring transistor TTR. As a result, the electric potential of the tank node NT rises from −VCC as indicated by B2. The level shifter 50 converts the positive electric potential of the tank node NT into a negative electric potential and outputs the voltage COLQ (which has been converted into a positive electric potential as indicated by B3) to the AD converting section 130. The A/D converting section 130 converts the voltage COLQ into digital data DOUT and outputs the digital data.

In the comparative example shown in FIG. 1C, it is necessary to provide a sensor capacitor CS and a plurality of switches SW1 to SW4 in each of the sensor cells, thus making it difficult to reduce the pitch of the sensor cells, i.e., the pixel pitch. Conversely, in this embodiment, the pixel pitch can be reduced because each of the sensor cells (pixels) can be made up of, for example, one infrared detection element CF and one selecting transistor TSEL.

4. Alternative Example of Negative Potential Generating Circuit

FIG. 9 shows an alternative example of a negative potential generating circuit 30' included in an infrared detection circuit according to the second embodiment.

The negative potential generating circuit 30' includes a first negative potential generating capacitor CBI having one end connected to the tank node NT. The negative potential generating capacitor CB1 also serves as a tank capacitor connected to the tank node NT. That is, the capacitor CB1 has both the function (role) of a negative potential generating capacitor and the function (role) of a tank capacitor.

The negative potential generating circuit 30' includes a second negative potential generating capacitor CB2 having one end connected to the tank node NT. The second negative potential generating capacitor CB2 has a larger capacitance value than the first negative potential generating capacitor CB1. In FIG. 9, the voltage COLQ, which is obtained by converting the negative electric potential of the tank node NT into a positive electric potential, is outputted from a node NB2 at the other end of the negative potential generating capacitor CB2. Thus, the function of the level shifter 50 shown in FIG. 7B is accomplished using the negative potential generating capacitor CB2 provided in the negative potential generating circuit 30'.

The negative potential generating circuit 30' shown in FIG. 9 also includes a first driver BF1 and a second driver BF2. The driver BF1 drives a node NB1 at the other end of the negative potential generating capacitor CB1. The driver BF2 drives the node NB2 at the other end of the negative potential generating capacitor CB2.

More specifically, when the tank node NT is set to a negative potential, the driver BF1 changes the other end of the negative potential generating capacitor CB1 from VCC (second voltage level) to 0 V (first voltage level). The driver BF2 changes the other end of the negative potential generating capacitor CB2 from VCC to 0 V.

In other words, when a negative potential generating voltage VB and a control voltage VCT change from 0 V to a voltage VCC, the driver BF1 (which functions as an inverter) changes the node NB1 at the other end of the negative potential generating capacitor CB1 from VCC to 0 V and the driver BF2 changes the node NB2 at the other end of the negative potential generating capacitor CB2 from VCC to 0 V. As a result, the capacitors CB1 and CB2 function as negative potential generating capacitors and the electric potential of the tank node NT is set to the negative potential −VCC.

After the voltage level of the node NB2 at the other end of the negative potential generating capacitor CB2 is changed to 0 V (first voltage level) the driver BF2 sets the node NB2 at the other end of the negative potential generating capacitor CB2 to a high impedance state. In other words, when the control voltage VCT changes from VCC to 0 V, the N-type transistor TB2 turns off and output of the driver BF2 is set to a high impedance state. As a result, the capacitor CB2 functions as a level shifting capacitor and the voltage COLQ (which has been converted from a negative electric potential to a positive electric potential as indicated by B3 in FIG. 8) is outputted from the node NB2.

With the configuration shown in FIG. 9, the function of setting the tank node NT to a negative electric potential, the function of the tank capacitor CTA, and the function of the level shifter 50 can be accomplished with one negative potential generating circuit 30'. As a result, the circuit can be made more compact and layout surface area can be reduced.

In FIG. 9, the capacitance value of the capacitor CB2 is larger than the capacitance value of the capacitor CB1. For example, when the tank node NT is set to a negative potential, it is preferable for the capacitance value of the negative potential generating capacitor to be as large as possible. The example shown in FIG. 9 is a favorable design in this regard because both of the capacitors CB1 and CB2 function as negative potential generating capacitors.

After the tank node NT is set to a negative electric potential, the node NB2 at the other end of the capacitor CB2 is set to a high impedance state such that the capacitor CB1 alone functions as a tank capacitor. In this way, the capacitance value of the tank capacitor can be set more easily.

When the node NB2 is set to a high impedance state, the capacitor CB2 can function as a level shifting capacitor and the voltage COLQ can be outputted from the node NB2 after it has been level shifted to a negative electric potential.

5. Third Embodiment

Figure 10:
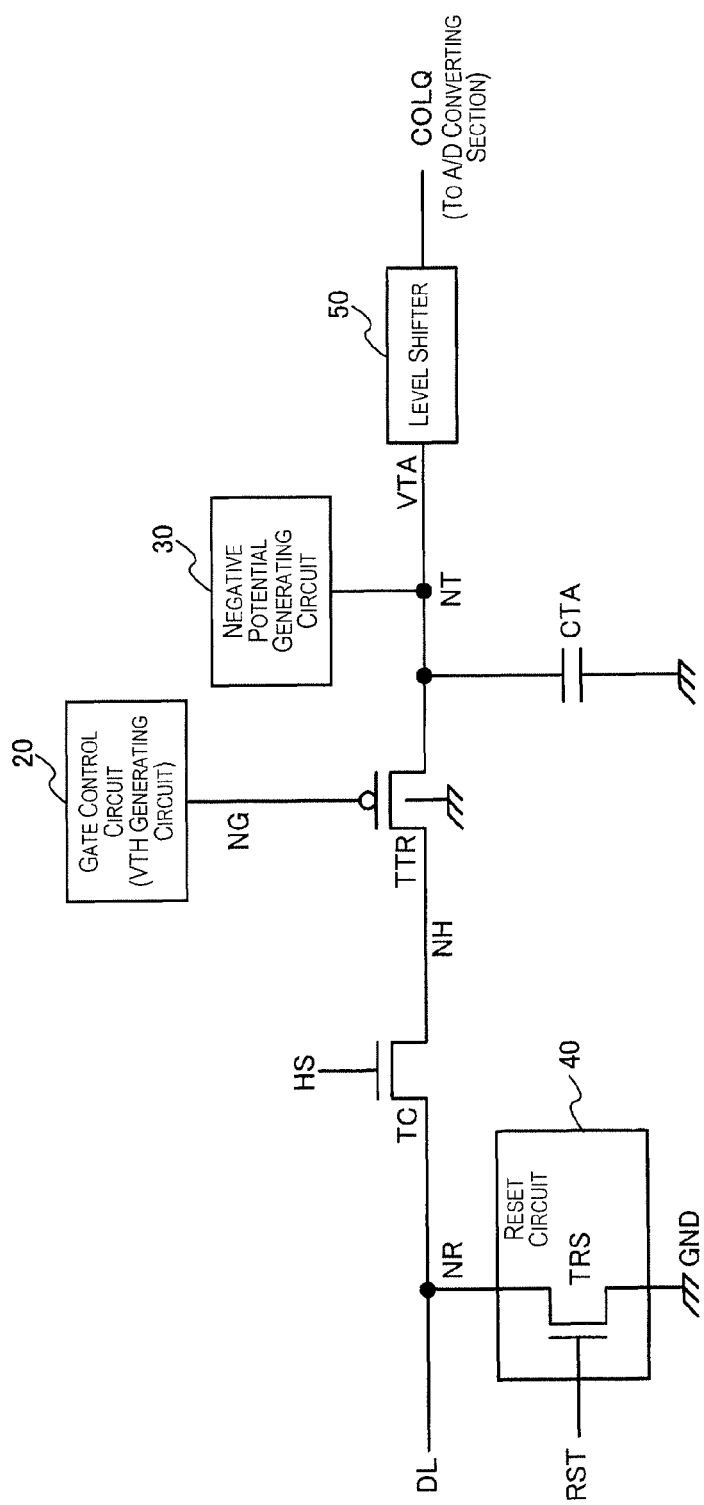
FIG. 10 is a diagram of an infrared detection circuit according to a third embodiment.
Figure 11:
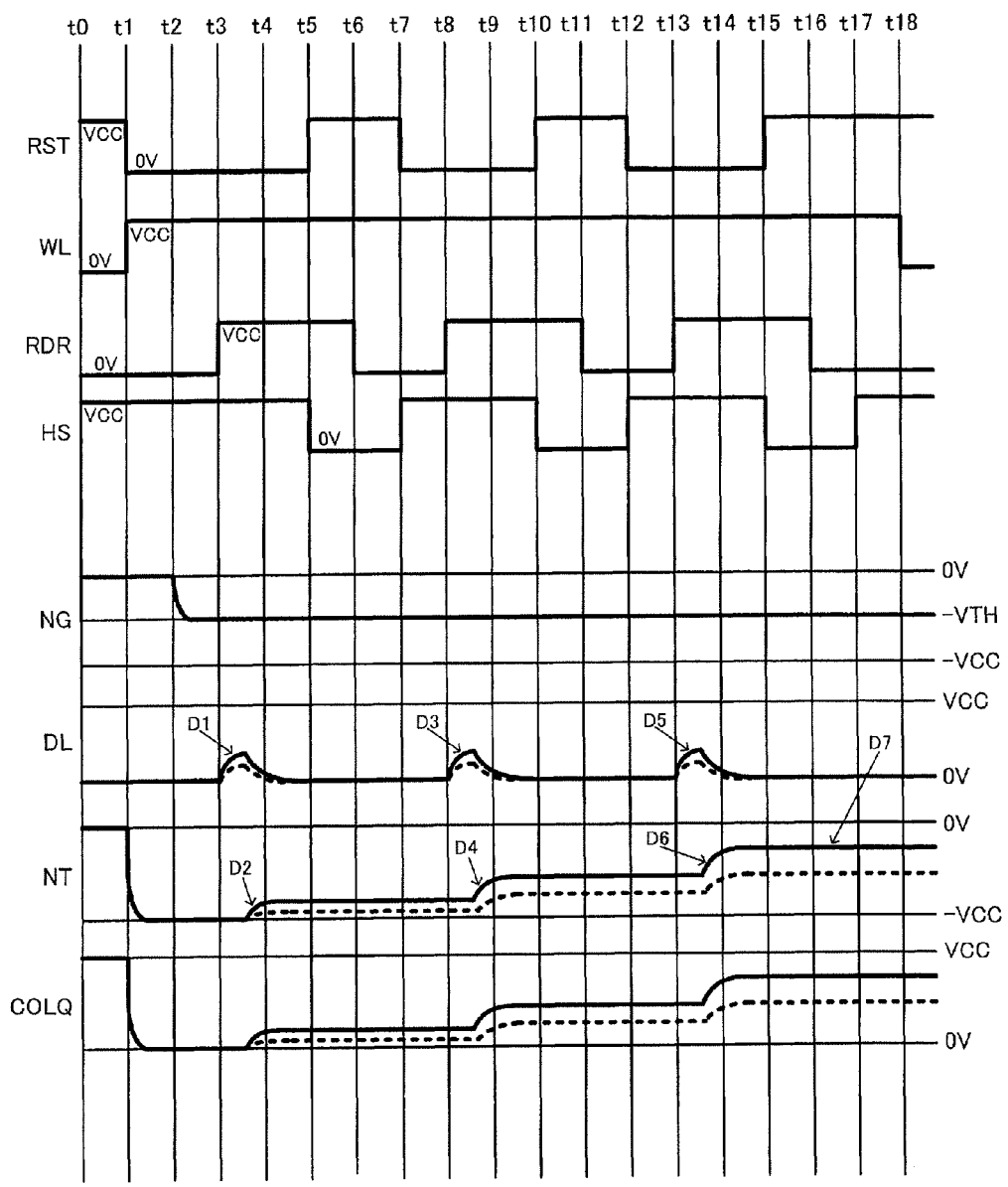
FIG. 11 is a time chart showing an example of signal waveforms for explaining the operation of the infrared detection circuit according to the third embodiment.

Referring now to FIGS. 10 and 11, an infrared detection circuit in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity.

FIG. 10 shows an infrared detection circuit according to the third embodiment. The third embodiment shown in FIG. 10 differs from the second embodiment shown in FIG. 7B in that the third embodiment shown in FIG. 10 also includes a control transistor TC. Also, the third embodiment achieves a higher sensitivity by executing a charge reading operation a plurality of times (N times). The infrared diction circuit according to the third embodiment is used in the read circuit 120 of the sensor device shown in FIGS. 6A and 6B.

The control transistor TC is provided between the node (read node NR) of the column line DL and the charge transferring transistor TTR. A control signal HS controls the on-off state of the control transistor TC. More specifically, a control circuit (not shown) controls turning the control transistor TC on and off. After the control transistor TC executes an operation of turning on and off a plurality of times (N times), a detection voltage VTA is acquired from the tank node NT. That is, a pixel acquiring circuit of the A/D converting section or other section acquires the detection voltage VTA. For example, the detection voltage VTA of the tank node NT is converted to a positive electric potential by the level shifter 50, sampled by the A/D converting section 130, and converted into digital data DOUT.

Thus, when the control transistor TC has executed the on-off operation N times, a capacitance value of the tank capacitor CTA is preferably set to N times a capacitance value of the infrared detection element CF or larger. In other words, the capacitance value of the tank capacitor CTA is larger than the capacitance value of the infrared detection element CF by at least the number of times the read operation is executed. With this aspect, a situation in which a detection voltage of the tank node NT becomes saturated can be prevented. Furthermore, it is also acceptable for the tank capacitor CTA to be a capacitor provided in another circuit, such as the negative potential generating circuit 30' as shown in FIG. 9.

The signal waveforms shown in FIG. 11 will now be used to explain the operation of a detection circuit according to the third embodiment. Control timings of the reset signal RST, the voltage applied to the row line WL, the voltage applied to the drive line RDR, the control signal HS, the voltage applied to the gate node NG, and the voltage applied to the tank node NT are controlled as shown in FIG. 11 by the control circuit 150.

The operation at times t1 and t2 of FIG. 11 are substantially the same as the operation of the second embodiment shown in FIG. 8. At a time t3, the drive line RDR changes from 0 V to VCC and the control transistor TC is on because the control signal HS of the control transistor TC is on. Thus, an electric charge read from a sensor cell to a column line DL as indicated by D1 in FIG. 11 is transferred to the tank node NT through the control transistor TC and the charge transferring transistor TTR as indicated by D2. As a result, the electric potential of the tank node NT rises from −VCC and a first electric charge reading operation is accomplished.

At a time t5, the drive line RDR remains at VCC, the control signal HS changes from the voltage VCC to 0 V, and the control transistor TC turns off. At the same time, the reset signal RST changes from 0 V to VCC and the node of the column line DL is reset to 0 V.

At a time t6, the drive line RDR changes from VCC to 0 V while the control transistor TC remains off. At a time t7, the drive line RDR remains at 0 V while the control signal HS changes from 0 V to VCC and the control transistor TC turns on.

At a time t8, the drive line RDR changes from 0 V to VCC while the control transistor TC remains on. Thus, an electric charge read from the sensor cell to the column line DL as indicated by D3 is transferred to the tank node NT through the control transistor TC and the charge transferring transistor TTR as indicated by D4. As a result, the electric potential of the tank node NT rises and a second electric charge reading operation is accomplished. Similarly, a third electric charge reading operation is accomplished as indicated by D5 and D6.

After read operations are executed a plurality of times (N times) as explained above, the voltage COLQ obtained by converting the detection voltage VTA ultimately obtained at the tank node NT into a positive electric potential is outputted to the A/D converting section 130 to obtain the final digital data. With this configuration, even if the amount of electric charge read from the infrared detection element CF in one read operation is small, a resolution of the detection voltage can be increased and the sensitivity of the infrared detection can be increased.

Assuming the number of times the read operation is executed is N, a situation in which the detection voltage VTA becomes saturated and exceeds an appropriate voltage range can be prevented, as indicated by D7 in FIG. 11, by making the capacitance value of the tank capacitor CTA at least N times larger than the capacitance value of the infrared detection element CF.

As shown in FIG. 11, during a period when the control transistor TC is on (e.g., from t2 to t4), the voltage level of the drive line RDR (voltage level of the voltage application node on the other end of the infrared detection element) changes (at the time t3) from 0 V (first voltage level) to the voltage VCC (second voltage level). That is, the row driver 110 changes the voltage level of the drive line PDR from 0 V to VCC. Meanwhile, the control transistor TC turns off (at the time t5) after the drive line RDR has changed to VCC and, during a period while the transistor TC is off (from t5 to t7), the voltage level of the drive line RDR (voltage application node) changes from VCC to 0 V (at the time t6).

Additionally, as shown in FIG. 11, the node (read node NR) of the column line DL is reset to 0 V during the period when the control transistor TC is off (from t5 to t7).

Thus, by changing the drive line RDR to the voltage VCC (at the time t3) during a period when the control transistor TC is on, an electric charge can be transferred properly from the infrared detection element CF to the tank node NT. Meanwhile, by changing the drive line RDR from the voltage VCC to 0 V (at the time t6) during a period when the control transistor TC is off, a situation in which changing the voltage level of the drive line RDR has an adverse effect on the tank node NT and causes a detection error can be prevented.

Furthermore, by making the reset circuit 40 reset the node of the column line DL (read node NR) to 0 V during a period when the control transistor TC is off (from t5 to t7), the circuit can prepare for the next electric charge reading operation and a situation in which changing the voltage level of the column line DL has an adverse effect on the tank node NT and causes a detection error can be prevented.

6. Fourth Embodiment

Figure 12:
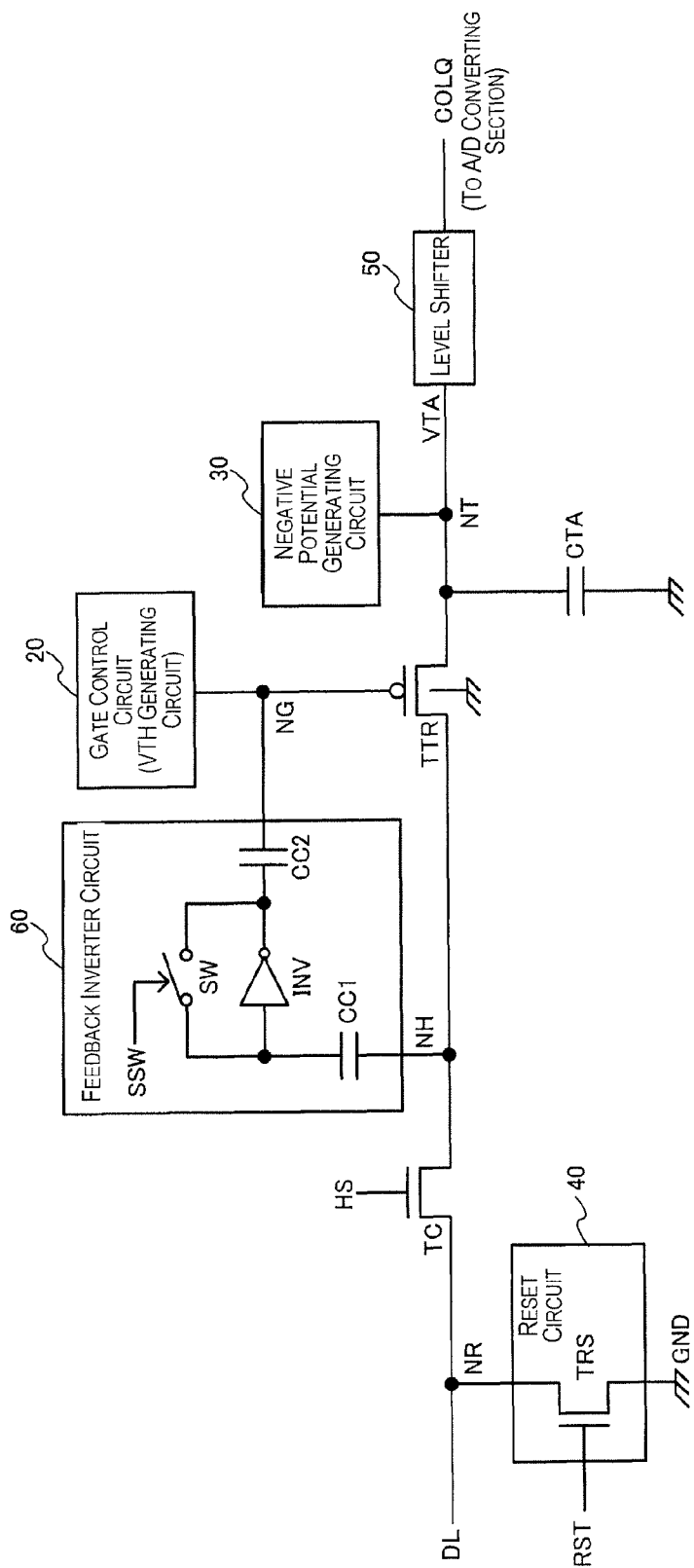
FIG. 12 is a diagram of an infrared detection circuit according to a fourth embodiment.
Figure 13:
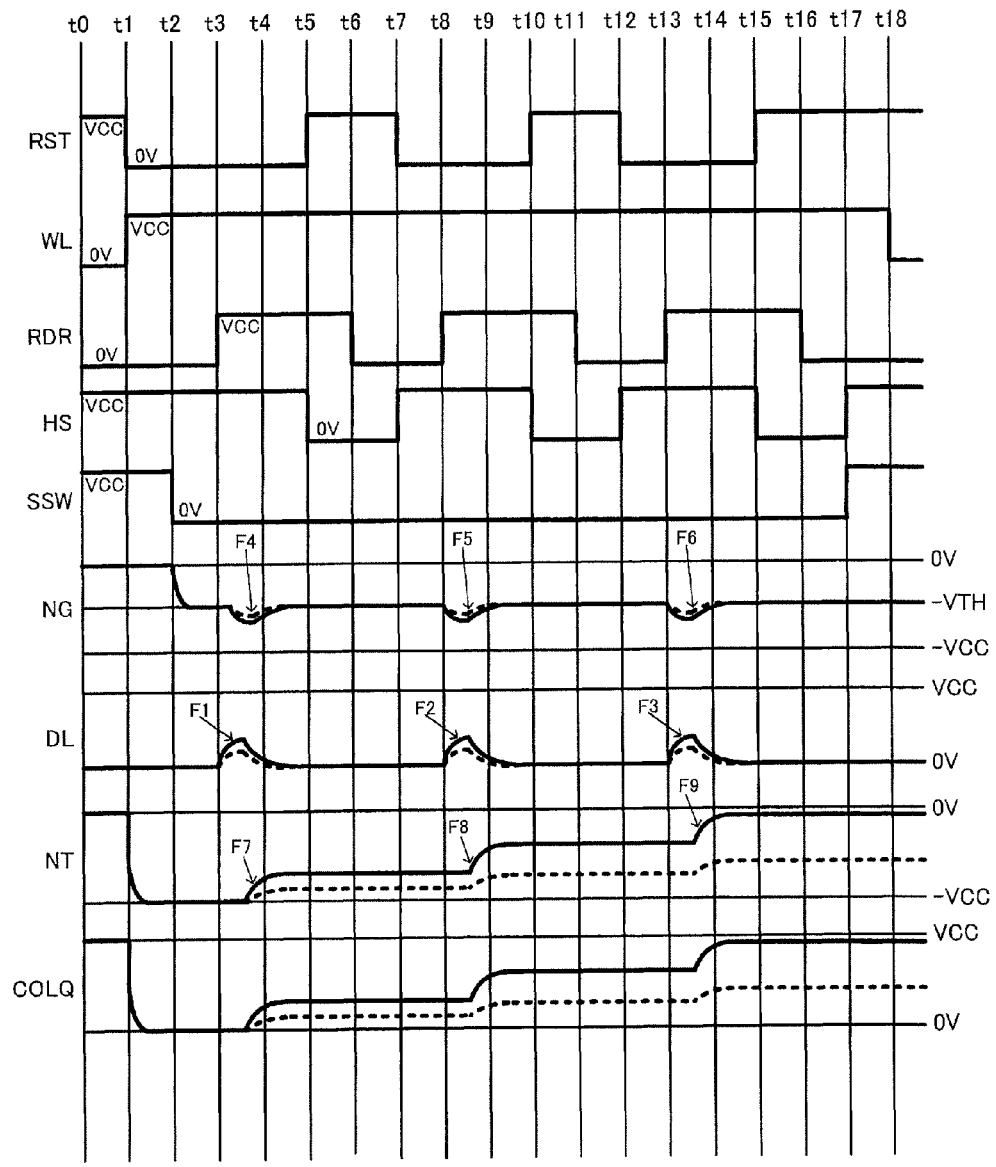
FIG. 13 is a time chart showing an example of signal waveforms for explaining the operation of the infrared detection circuit according to the fourth embodiment.

Referring now to FIGS. 12 and 13, an infrared detection circuit in accordance with a fourth embodiment will now be explained. In view of the similarity between the first to fourth embodiments, the parts of the fourth embodiment that are identical to the parts of the first, second or third embodiment will be given the same reference numerals as the parts of the first, second or third embodiment. Moreover, the descriptions of the parts of the fourth embodiment that are identical to the parts of the first, second or third embodiment may be omitted for the sake of brevity.

FIG. 12 shows an infrared detection circuit according to the fourth embodiment. The fourth embodiment shown in FIG. 12 differs from the third embodiment shown in FIG. 10 in that the fourth embodiment shown in FIG. 12 further includes a feedback inverter circuit 60. Also, the fourth embodiment achieves a higher sensitivity by executing a charge reading operation a plurality of times. The infrared diction circuit according to the fourth embodiment is used in the read circuit 120 of the sensor device shown in FIGS. 6A and 6B.

The feedback inverter circuit 60 shown in FIG. 12 is a circuit configured to invert an electric potential change of a node NH located on an opposite side of the charge transferring transistor TTR as the tank node NT and output the inverted electric potential to the gate node NG of the charge transferring transistor TTR.

The feedback inverter circuit 60 includes an inverter INV, a feedback switch SW, and AC coupling capacitors CC1 and CC2. One end of the switch SW is connected to an input of the inverter INV, and the other end of the switch SW is connected to an output of the inverter INV. When the switch SW is on, the output of the inverter INV is fed back to the input and the inverter INV functions as a circuit amplifying an intermediate electric potential. One end of the capacitor CC1 is connected to the node NH and the other end is connected to the input of the inverter INV. One end of the capacitor CC2 is connected to the gate node NG and the other end is connected to the output of the inverter INV.

With this embodiment, a read operation having a higher amplification degree can be accomplished because the gate of the charge transferring transistor TTR is controlled by using the feedback inverter circuit 60 to amplify an electric potential change.

The signal waveforms shown in FIG. 13 will now be used to explain the operation of a detection circuit according to the fourth embodiment. Control timings of the reset signal RST, the voltage applied to the row line WL, the voltage applied to the drive line RDR, the control signal HS, the control signal SSW, the voltage applied to the gate node NG, and the voltage applied to the tank node NT are controlled as shown in FIG. 13 by the control circuit 150.

As shown in FIG. 13, at a time t2 a control signal SSW of the switch SW goes to 0 V and causes the switch SW to turn on. As a result, the input and the output of the inverter INV of the feedback inverter circuit 60 are connected together and the inverter INV functions as an amplifying circuit. As when the node of the column line DL changes to a positive electric potential indicated by F1, F2, and F3 in FIG. 13, the feedback inverter circuit 60 controls the gate node NG to a negative potential as indicated by F4, F5, and F6. As a result, the electric potential of the detection voltage of the tank node NT is amplified as indicated by F7, F8, and F9 and a reading operation having a higher amplification degree than in D2, D4, and D6 of FIG. 11 can be accomplished. In this way, infrared detection with an even higher degree of sensitivity can be accomplished by using the feedback inverter circuit 60 to increase the amplification degree.

7. Electronic Instrument

Figure 14:
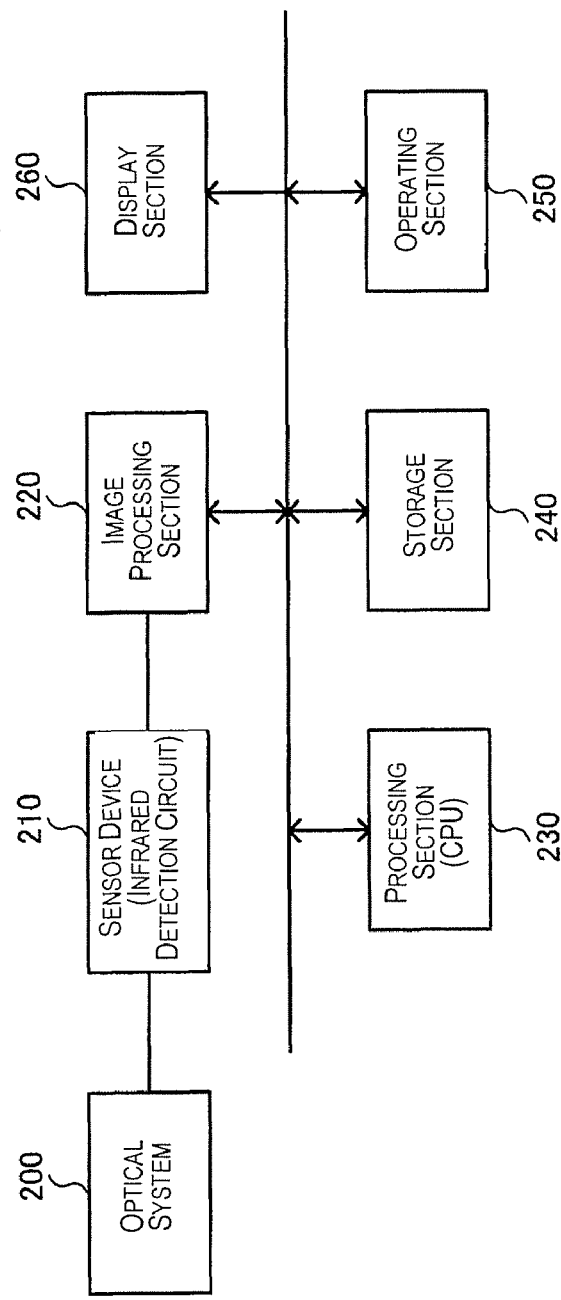
FIG. 14 is a diagram showing an electronic instrument equipped with the sensor device according to any of the illustrated embodiments.

FIG. 14 shows an electronic instrument to which the infrared detection circuit and the sensor device according to any of the illustrated embodiment can be applied. The electronic instrument includes an optical system 200, a sensor device 210 (infrared detection circuit), an image processing section 220, a processing section 230, a storage section 240, an operating section 250, and a display section 260. An electronic instrument according to this embodiment is not limited to the constituent features shown in FIG. 14. Various changes can be made. For example, a portion of the components (e.g., the optical system, the operating section, and the display section) can be removed and/or other components can be added.

The optical system 200 includes, for example, one lens or a plurality of lens and a drive section to drive the lens or lenses. The optical system 200 serves to form an image of an object on a sensor device 210. If necessary, it also executes a focus adjustment.

The sensor device 210 is the same as the sensor device explained with reference to FIG. 6A and serves to execute image processing of the object image. The image processing section 220 the executes image revision processing and other image processing based on the digital image data (pixel data) from the sensor device 210. It is also acceptable to use an infrared detection circuit instead of a sensor device 210 (image sensor).

The processing section 230 controls the entire electronic instrument and controls each block inside the electronic instrument. The processing section 230 comprises, for example, a CPU. The storage section 240 is configured to store various types of information and functions as a work region for the processing section 230 and the image processing section 220. The operating section 250 is an interface through which a user can operate the electronic instrument and comprises, for example, a set of buttons or a GUI (graphical user interface). The display section 260 serves to display a GUI screen or an image acquired by the sensor device 210 and comprises a liquid crystal display, an organic EL display, projector, or another type of display.

Also, the embodiment described heretofore can be used in an infrared camera employing an FPA (focal plane array), and such infrared camera can be used in a night vision instrument configured to capture an image of an object at night, a thermographic instrument configured to acquire a temperature distribution of an object, an intruder detecting instrument configured to detect an intruding person, an analysis instrument (measuring instrument) configured to analyze (measure) physical information with respect to an object, a security instrument configured to detect a fire or heat, or an FA (factory automation) instrument provided in a factory. And the embodiment described heretofore can be used in a vehicle video system configured to detect and display an image of a person or other object when a vehicle is traveling at night, or a thermographic instrument used for such a purpose as influenza quarantine.

Although an embodiment is described in detail herein, it should be clear to those skilled in the art that many variations can be conceived without departing from the new matter and effects of the present invention in a substantive way. Thus, such variations are included in the scope of the invention. For example, in the specification and the drawings there are some terms that are presented at least once together with other terms that have a broader meaning or the same meaning (e.g., first power supply node, second power supply node, first voltage level, and second voltage level). Each of these terms can be replaced with the corresponding other term at any location in the specification and drawings. The constituent features and operation of the infrared detection circuit, sensor device, and electronic instrument are not limited to those described in the embodiment and numerous variations are possible.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An infrared detection circuit comprising:
    a charge transferring transistor disposed between a read node configured to be connected to one end of an infrared detection element and a tank node to transfer an electric charge from the infrared detection element to the tank node;
    a gate control circuit connected to a gate of the charge transferring transistor; and
    a negative potential generating circuit connected to the tank node to set the tank node to a negative electric potential when the charge transferring transistor transfers the electric charge, the negative potential generating circuit having a first negative potential generating capacitor disposed between the tank node and a voltage node generating negative potential.

2. The infrared detection circuit according to claim 1, wherein
    the gate control circuit is configured to output a prescribed gate control voltage corresponding to a threshold voltage of the charge transferring transistor to the gate of the charge transferring transistor.

3. The infrared detection circuit according to claim 1, further comprising
a reset circuit disposed between the read node and a first power supply node to reset the read node to a first voltage level equal to a voltage level of the first power supply node during a reset period.

4. The infrared detection circuit according to claim 1, wherein
the gate control circuit is configured to turn on the charge transferring transistor after the negative potential generating circuit has set the tank node to the negative electric potential and before a voltage application node at another end of the infrared detection element changes from a first voltage level to a second voltage level.

5. An electronic instrument including the infrared detection circuit according to claim 1.

6. An infrared detection circuit comprising:
a charge transferring transistor disposed between a read node configured to be connected to one end of an infrared detection element and a tank node to transfer an electric charge from the infrared detection element to the tank node;
a gate control circuit connected to a gate of the charge transferring transistor; and
a negative potential generating circuit connected to the tank node to set the tank node to a negative electric potential when the charge transferring transistor transfers the electric charge, wherein
the negative potential generating circuit includes a first negative potential generating capacitor having a first end connected to the tank node with the first negative potential generating capacitor also serving as a tank capacitor connected to the tank node and a second negative potential generating capacitor having a first end connected to the tank node with a second end of the second negative potential generating capacitor being configured to output a voltage equal to the negative electric potential of the tank node converted to a positive electric potential.

7. An electronic instrument including the infrared detection circuit according to claim 6.

8. An infrared detection circuit comprising:
a charge transferring transistor disposed between a read node configured to be connected to one end of an infrared detection element and a tank node to transfer an electric charge from the infrared detection element to the tank node;
a gate control circuit connected to a gate of the charge transferring transistor; and
a negative potential generating circuit connected to the tank node to set the tank node to a negative electric potential when the charge transferring transistor transfers the electric charge, wherein
the negative potential generating circuit includes
a first negative potential generating capacitor having a first end connected to the tank node,
a second negative potential generating capacitor having a first end connected to the tank node with the second negative potential generating capacitor having a larger capacitance value than the first negative potential generating capacitor,
a first driver configured to drive a second end of the first negative potential generating capacitor, and
a second driver configured to drive a second end of the second negative potential generating capacitor,
when the tank node is set to the negative electric potential, the first driver being configured to change a voltage level of the second end of the first negative potential generating capacitor from a second voltage level to a first voltage level, and the second driver being configured to change a voltage level of the second end of the second negative potential generating capacitor from the second voltage level to the first voltage level, and
after the voltage level of the second end of the second negative potential generating capacitor has been changed to the first voltage level, the second driver being further configured to set the second end of the second negative potential generating capacitor to a high impedance state.

9. An electronic instrument including the infrared detection circuit according to claim 8.

10. An infrared detection circuit comprising:
a charge transferring transistor disposed between a read node configured to be connected to one end of an infrared detection element and a tank node to transfer an electric charge from the infrared detection element to the tank node;
a gate control circuit connected to a gate of the charge transferring transistor;
a negative potential generating circuit connected to the tank node to set the tank node to a negative electric potential when the charge transferring transistor transfers the electric charge; and
a control transistor disposed between the read node and the charge transferring transistor so that a detection voltage is acquired from the tank node after the control transistor has executed an operation of turning on and off a plurality of times.

11. An electronic instrument including the infrared detection circuit according to claim 10.

12. The infrared detection circuit according to claim 10, further comprising
a tank capacitor having one end connected to the tank node, with a capacitance value of the tank capacitor being at least N times larger than a capacitance value of the infrared detecting element, where N is a number of times the control transistor executes an operation of turning on and off.

13. The infrared detection circuit according to claim 10, wherein
the control transistor is configured to execute the operation of turning on and off so that a voltage level of a voltage application node at another end of the infrared detection element is changed from a first voltage level to a second voltage level during a period when the control transistor is on, and, after the voltage level of the voltage application node has been changed to the second voltage level, the control transistor turns off and the voltage level of the voltage application node is changed from the second voltage level to the first voltage level during a period while the control transistor is off.

14. The infrared detection circuit according to claim 13, further comprising
a reset circuit connected to the read node to reset a voltage level of the read node to the first voltage level during a period when the control transistor is off.

15. An infrared detection circuit comprising:
a charge transferring transistor disposed between a read node configured to be connected to one end of an infrared detection element and a tank node to transfer an electric charge from the infrared detection element to the tank node;

a gate control circuit connected to a gate of the charge transferring transistor;

a negative potential generating circuit connected to the tank node to set the tank node to a negative electric potential when the charge transferring transistor transfers the electric charge; and a feedback inverter circuit configured to invert an electric potential change of a node located on a different side of the charge transferring transistor than the tank node, and to output the inverted electric potential change to the gate of the charge transferring transistor.

16. A sensor device comprising:

a sensor array having a plurality of sensor cells arranged in an array;

one or more row lines;

one or more column lines;

a row selecting circuit connected to the one or more row lines; and a read circuit connected to the one or more column lines, each of the sensor cells including an infrared detection element, and a selecting transistor disposed between the infrared detection element and a corresponding one of the one or more column lines with a gate of the selecting transistor being controlled by a corresponding one of the one or more row lines, and the read circuit including one or more infrared detection circuits respectively connected to the one or more column lines, each of the infrared detecting circuits including a charge transferring transistor disposed between a tank node and a node of a corresponding one of the one or more column lines to transfer an electric charge from the infrared detection element connected to the corresponding one of the one or more column lines to the tank node, a gate control circuit connected to a gate of the charge transferring transistor, and a negative potential generating circuit connected to the tank node to set the tank node to a negative electric potential when the charge transferring transistor transfers the electric charge, the negative potential generating circuit having a first negative potential generating capacitor disposed between the tank node and a voltage node generating negative potential.

17. An electronic instrument including the infrared detection circuit according to claim 15.

18. An electronic instrument including the sensor device according to claim 16.

* * * * *